(12) United States Patent
Kubota et al.

(10) Patent No.: US 8,842,378 B2
(45) Date of Patent: Sep. 23, 2014

(54) IMAGING LENS

(75) Inventors: Yoji Kubota, Nagano (JP); Kenichi Kubota, Nagano (JP); Hitoshi Hirano, Nagano (JP); Ichiro Kurihara, Tochigi (JP)

(73) Assignees: Optical Logic Inc., Ina (JP); Kantatsu Co., Ltd., Yaita (JP)

( * ) Notice: Subject to any disclaimer, the term of this patent is extended or adjusted under 35 U.S.C. 154(b) by 317 days.

(21) Appl. No.: 13/363,766

(22) Filed: Feb. 1, 2012

(65) Prior Publication Data

US 2012/0127584 A1 May 24, 2012

Related U.S. Application Data

(63) Continuation of application No. PCT/JP2010/065595, filed on Sep. 10, 2010.

(30) Foreign Application Priority Data

Sep. 18, 2009 (JP) ................................. 2009-216323

(51) Int. Cl.
| | |
|---|---|
| *G02B 9/34* | (2006.01) |
| *G02B 13/04* | (2006.01) |
| *G02B 3/02* | (2006.01) |
| *G02B 13/00* | (2006.01) |

(52) U.S. Cl.
CPC ............... *G02B 13/004* (2013.01); *G02B 9/34* (2013.01)
USPC ............................ 359/772; 359/753; 359/715

(58) Field of Classification Search
USPC .......................................... 359/715, 753, 772
See application file for complete search history.

(56) References Cited

U.S. PATENT DOCUMENTS

| | | | |
|---|---|---|---|
| 2009/0128927 A1 | 5/2009 | Chen et al. | |
| 2011/0157449 A1* | 6/2011 | Chen et al. | ..................... 348/335 |

FOREIGN PATENT DOCUMENTS

| | | | |
|---|---|---|---|
| JP | 2009-098513 A | 5/2009 |
| JP | 2009-098514 A | 5/2009 |
| JP | 2009-098515 A | 5/2009 |
| JP | 2009-098516 A | 5/2009 |
| JP | 2009-122634 A | 6/2009 |

\* cited by examiner

*Primary Examiner* — William Choi
(74) *Attorney, Agent, or Firm* — Kubotera & Associates, LLC

(57) ABSTRACT

An imaging lens includes a first lens having positive refractive power; a second lens having negative refractive power; a third lens having negative refractive power; and a fourth lens having negative refractive power, arranged from an object side to an image plane side. In the first lens, a curvature radius on an object-side surface is positive and a curvature radius of an image-side surface is negative. In the third lens, curvature radii of an object-side surface and an image-side surface are both negative. In the fourth lens, curvature radii of an object-side surface and an image-side surface thereof are both positive. When the whole lens system has a focal length f and a distance from the object-side surface of the first lens to an image-side surface of the fourth lens is L14, the imaging lens satisfies the following expression:

$$0.5 < L14/f < 0.8$$

10 Claims, 18 Drawing Sheets

IMAGING LENS

CROSS-REFERENCE TO RELATED APPLICATIONS

This is a continuation application of the prior PCT application PCT/JP2010/065595, filed on Sep. 10, 2010, pending, which claims priority from a Japanese patent application No. 2009-216323, filed on Sep. 18, 2009, the entire content of which is incorporated herein by reference.

BACKGROUND OF THE INVENTION AND RELATED ART STATEMENT

The present invention relates to an imaging lens for forming an image on an imaging element such as a CCD sensor and a CMOS sensor. In particular, the present invention relates to an imaging lens suitable for mounting in a relatively small camera such as a cellular phone, a digital still camera, a portable information terminal, a security camera, an onboard camera, and a network camera.

An imaging lens for mounting in such a small camera is strongly required to have a small size, and also sufficient optical performances that can be compatible with imaging elements with high resolution that are available in these years. Conventionally, when resolution of an imaging lens was not so high, it was possible to attain both sufficient optical performances suitable for the resolution of the imaging element and miniaturization. However, as resolution of an imaging lens becomes higher, required optical performances become higher, so that it becomes difficult to attain both sufficient optical performances with satisfactorily corrected aberration and miniaturization using a two- or three-lens configuration.

For this reason, there have been studies on adding another lens, i.e., an imaging lens with a four-lens configuration. For example, an imaging lens described in Patent Reference includes in this order from an object side, a first lens that has a convex shape on the object side and is positive; a second lens that has a shape of a negative meniscus lens directing a convex surface thereof to the object side; a third lens that has a shape of a negative meniscus lens directing a concave surface thereof to the object side; and a fourth lens that has a negative meniscus lens directing a convex surface thereof to the object side. According to this configuration, satisfactory optical performances are obtained while restraining increase of a total length of the imaging lens by setting preferred ranges for a ratio of a focal length of the imaging lens and a focal length of the third lens and for a ratio of a distance on an optical axis from an object-side surface of the first lens to an image-side surface of the fourth lens and the focal length of the imaging lens, and then respectively keeping those ratios within the ranges.

Patent Reference: Japanese Patent Publication No. 2009-98513

According to the imaging lens described in Patent Reference, it is possible to attain relatively satisfactory aberrations. Every year, however, there have been advancements in miniaturization and performances of devices themselves for mounting in the above-described small cameras, so that the size required for such imaging lens has become even smaller than before. In case of the lens configuration described in Patent Reference, it is difficult to attain both miniaturization and satisfactory aberration correction to meet the above-described requirements.

In view of the problems of the conventional techniques described above, an object of the present invention is to provide an imaging lens that can satisfactorily correct aberration in spite of a small size thereof.

SUMMARY OF THE INVENTION

In order to attain the object described above, according to the present invention, an imaging lens includes a first lens having positive refractive power; a second lens having negative refractive power; a third lens having negative refractive power; and a fourth lens having negative refractive power, arranged in this order from an object side to an image plane side. The first lens is formed in a shape so that a curvature radius on an object-side surface thereof is positive and a curvature radius of an image-side surface thereof is negative. The third lens is formed in a shape so that curvature radii of an object-side surface thereof and an image-side surface thereof are both negative. The fourth lens is formed in a shape so that curvature radii of an object-side surface and an image-side surface thereof are both positive. When the whole lens system has a focal length f and a distance on an optical axis from an object-side surface of the first lens to an image-side surface of the fourth lens is L14, the imaging lens having the above-described configuration satisfies the following conditional expression (1):

$$0.5 < L14/f < 0.8 \quad (1)$$

When the imaging lens satisfies the conditional expression (1), it is possible to shorten the distance on the optical axis (thickness) of the imaging lens while attaining satisfactory aberration correction. When the value exceeds the upper limit "0.8", the distance on the optical axis from the object-side surface of the first lens to the image-side surface of the fourth lens is long in relative to the focal length, so that it is difficult to attain miniaturization of the imaging lens. On the other hand, when the value is below the lower limit "0.5", although it is advantageous for miniaturization of the imaging lens, the thickness of each lens that composes the imaging lens is extremely small, so that fabrication properties and productivity are significantly impaired. Furthermore, it is also difficult to satisfactorily correct aberrations.

When the first lens has a focal length f1 and the second lens has a focal length f2, the imaging lens having the above-described configuration preferably satisfies the following conditional expression (2):

$$-0.8 < f1/f2 < -0.3 \quad (2)$$

When the imaging lens with the above configuration satisfies the conditional expression (2), it is possible to restrain an axial chromatic aberration, an off-axis chromatic aberration of magnification, and coma aberration within satisfactory ranges in a well balanced manner, while shortening the thickness of the imaging lens. When the value exceeds the upper limit "−0.3", the refractive power of the second lens becomes weak and the axial chromatic aberration and the off-axis chromatic aberration of magnification are insufficiently corrected (that of a short wavelength increases in a minus direction in relative to that of a reference wavelength). In addition, among aberrations of off-axis light fluxes, an outward coma aberration increases. On the other hand, when the value is below the lower limit "−0.8", although the second lens has strong refractive power and thereby the axial chromatic aberration is satisfactorily corrected, the off-axis chromatic aberration of magnification becomes excessively corrected (that of a short wavelength increases in a plus direction in relative to that of a reference wavelength). In addition, among aberrations of off-axis light fluxes, an inward coma aberration increases. Accordingly, in either case, it is difficult to obtain satisfactory image-forming performance.

When a composite focal length of the third lens and the fourth lens is f34, the imaging lens having the above-described configuration preferably satisfies the following conditional expression (3):

$$-0.3 < f/f34 < -0.05 \quad (3)$$

When the imaging lens satisfies the conditional expression (3), it is possible to attain miniaturization of the imaging lens. When the value exceeds the upper limit "−0.05", the composite focal length of the third lens and the fourth lens is long (composite refractive power of the third lens and the fourth lens is weak) in relative to a focal length of the lens system, so that it is difficult to attain miniaturization of the imaging lens. On the other hand, when the value is below the lower limit "−0.3", the composite focal length of the third lens and the fourth lens is short (composite refractive power of the third lens and the fourth lens is strong) in relative to the focal length of the lens system, so that a position of a principal point of the lens system moves towards the object side. Therefore, although it is advantageous for miniaturization of the imaging lens, it is necessary to increase refractive power of each lens, so that it is difficult to restrain a spherical aberration, a coma aberration, and so on within satisfactory ranges in a well balanced manner.

When a composite focal length of the first lens and the second lens is f12, the imaging lens having the above-described configuration preferably satisfies the following conditional expression (4):

$$-0.3 < f12/f34 < -0.05 \quad (4)$$

When the imaging lens satisfies the conditional expression (4), it is possible to restrain field curvature within a satisfactory range while attaining miniaturization of the imaging lens. When the value exceeds the upper limit "−0.05", a composite focal length of the third lens and the fourth lens is long in relative to the composite focal length of the first lens and the second lens, and it is difficult to reduce the thickness of the imaging lens. In addition, since the image surface is excessively corrected in the plus direction, it is also difficult to obtain satisfactory image-forming performance. Here, in this case, it is also difficult to correct astigmatism. On the other hand, when the value is below the lower limit "−0.3", the composite focal length of the third lens and the fourth lens is short in relative to the composite focal length of the first lens and the second lens, so that, although it is advantageous for miniaturization of the imaging lens, the image surface is insufficiently corrected in the minus direction and it is also difficult to obtain satisfactory image-forming performance.

When the first lens has Abbe's number vd1 and the second lens has Abbe's number vd2, the imaging lens having the above-described configuration preferably satisfies the following conditional expressions (5) and (6):

$$vd1 > 50 \quad (5)$$

$$vd2 < 30 \quad (6)$$

When the imaging lens satisfies the conditional expressions (5) and (6), it is possible to satisfactorily correct chromatic aberration. When the Abbe's number of the first lens or the Abbe's number of the second lens does not satisfies the conditional expression (5) or (6), the axial chromatic aberration is insufficiently corrected and thereby it is difficult to obtain satisfactory image-forming performance.

When the third lens has Abbe's number vd3 and the fourth lens has Abbe's number vd4, the imaging lens having the above-described configuration preferably satisfies the following conditional expressions (7) and (8):

$$vd1 = vd4 \quad (7)$$

$$vd2 = vd3 \quad (8)$$

When the imaging lens satisfies the conditional expressions (7) and (8), it is possible to further satisfactorily correct the axial chromatic aberration and the off-axis chromatic aberration of magnification.

Moreover, in the imaging lens having the above-described configuration, when the first lens and the fourth lens are made of a same material, and the second lens and the third lens are made of a same material, the number of types of materials that compose the imaging lens is only two, so that it is possible to reduce the manufacturing cost of the imaging lens.

As described above, in the imaging lens of the invention, the first lens having positive refractive power, the second lens having negative refractive power, the third lens having negative refractive power, and the fourth lens having negative refractive power are arranged in this order from the object side to the image plane side. Therefore, the first lens, which is the only positive lens, is the one having strong refractive power. Here, more preferably in the imaging lens having the above-described configuration, the object-side surface and the image-side surface of the second lens are respectively formed as spherical surfaces.

When the both surfaces of the second lens are formed as spherical surfaces, it is possible to effectively restrain impairment of image-forming performance due to de-centering (axial displacement), tilting, or the like of the first lens. In addition, by restraining impairment of the image-forming performance in this way, it is also possible to simplify production of the imaging lens and thereby it is even possible to reduce the manufacturing cost.

According to the imaging lens of the invention, it is possible to attain both miniaturization of the imaging lens and satisfactorily corrected aberrations, and it is possible to provide a small-sized imaging lens with satisfactorily corrected aberrations.

DETAILED DESCRIPTION OF PREFERRED EMBODIMENTS

Hereunder, referring to the accompanying drawings, an embodiment of the present invention will be fully described.

FIGS. 1, 4, 7, 10, 13 and 16 are sectional views of imaging lenses in Numerical Data Examples 1 to 6 according to the embodiment, respectively. Since a basic lens configuration is the same among the Numerical Data Examples, the lens configuration of the embodiment will be described with reference to the lens sectional view of Numerical Data Example 1.

Figure 1:
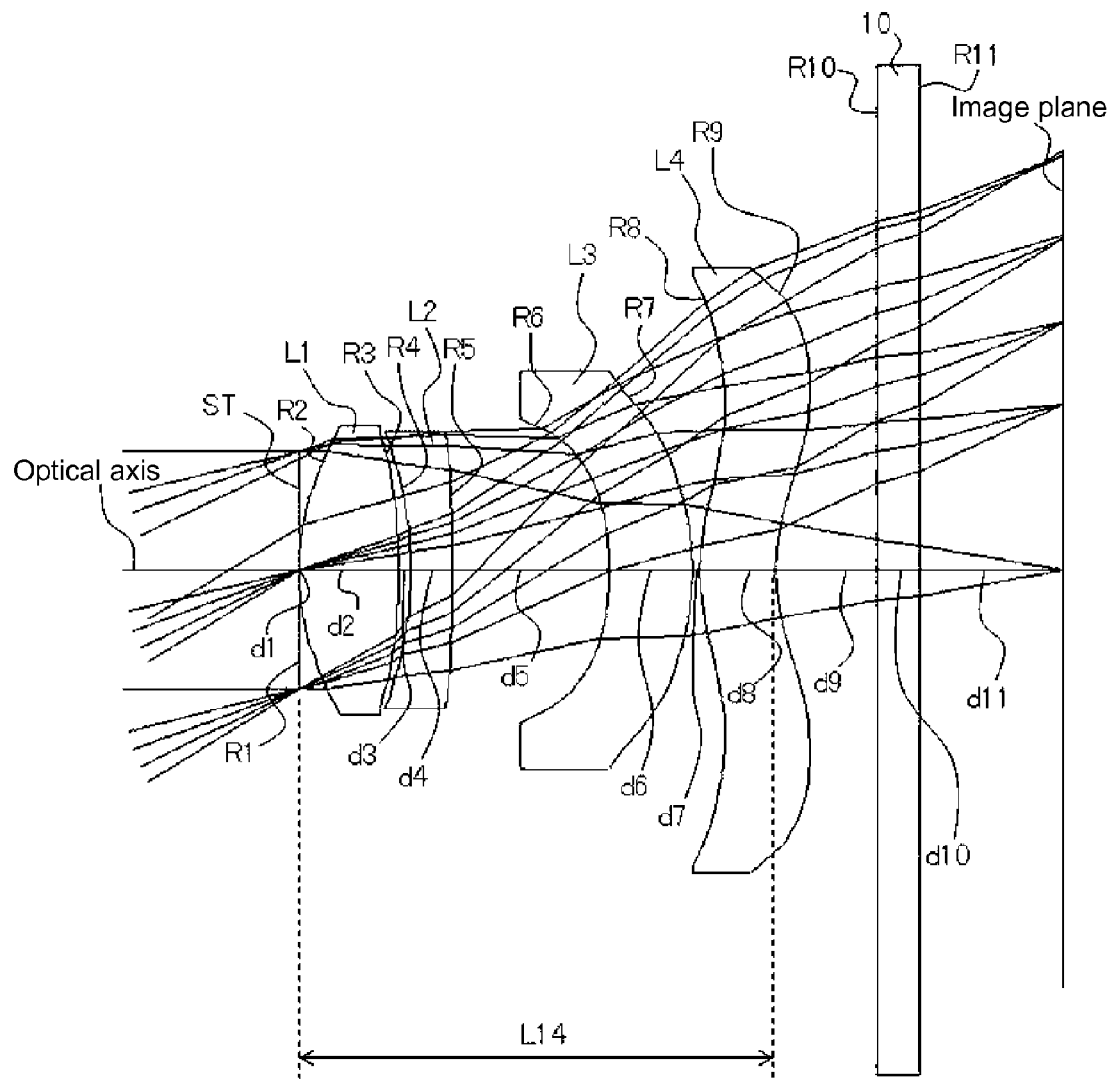
FIG. 1 is a schematic sectional view showing a configuration of an imaging lens in Numerical Data Example 1 according to an embodiment of the invention.

As shown in FIG. 1, the imaging lens of the embodiment has an aperture stop ST; a first lens L1 having positive refractive power; a second lens L2 having negative refractive power; a third lens L3 having negative refractive power; and a fourth lens L4 having negative refractive power, arranged in this order from an object side to an image plane side of the imaging lens. A cover glass 10 is provided between the fourth lens L4 and an image plane. Here, the cover glass 10 may be optionally omitted. In addition, according to the embodiment, the aperture stop is provided on a tangential plane of a vertex of the object-side surface of the first lens L1. The position of the aperture stop is not limited to the one in this embodiment, and for example, may be closer to the object side than the tangential plane of the vertex of the object-side surface of the first lens L1 or between the tangential plane of the vertex and the image-side surface of the first lens L1.

According to the imaging lens having the above-described configuration, the first lens L1 is formed in a shape so that a curvature radius R2 of an object-side surface thereof is positive and a curvature radius R3 of an image-side surface thereof is negative, i.e. a shape of a biconvex lens near an optical axis.

The second lens L2 is formed in a shape so that a curvature radius R4 of an object-side surface thereof and a curvature radius R5 of an image-side surface thereof are both negative, and has a shape of a meniscus lens directing a concave surface thereof towards the object side near the optical axis.

The shape of the second lens L2 is not limited to the shape of meniscus lens directing a concave surface thereof to the object side near the optical axis as described above. Numerical Data Examples 1 to 4 are examples, in which the shape of the second lens L2 is formed in a shape of a meniscus lens directing a concave surface thereof to the object side near the optical axis as described above. On the other hand, Numerical Data Example 5 is an example, in which the second lens L2 is formed in a shape so that the curvature radius R4 of the object-side surface thereof is negative and the curvature radius R5 of the image-side surface thereof is positive, i.e. a shape of a biconcave lens near the optical axis. Furthermore, Numerical Data Example 6 is an example, in which the second lens L2 is formed in a shape so that the curvature radius R4 of the object-side surface thereof and the curvature radius R5 of the image-side surface thereof are both positive, i.e. a shape of a meniscus lens directing a convex surface thereof to the object side near the optical axis.

The third lens L3 is formed in a shape so that a curvature radius R6 of an object-side surface thereof and a curvature radius R7 of an image-side surface thereof are both negative and has a shape of a meniscus lens directing a concave surface thereof to the object side near the optical axis. Here, the third lens L3 can have any shapes as long as a negative lens directing a concave surface thereof to the object side, i.e. a shape of a biconcave lens near the optical axis.

The fourth lens L4 is formed in a shape so that a curvature radius R8 of an object-side surface thereof and a curvature radius R9 of an image-side surface thereof are both positive and has a shape of a meniscus lens directing a convex surface thereof to the object side near the optical axis. Furthermore, the image-side surface of the fourth lens L4 is formed as an aspheric shape so as to have a convex shape on the object side near the optical axis and a concave shape on the object side in the periphery. Because of such shape of the fourth lens L4, it is possible to suitably restrain an incident angle of a light beam emitted from the imaging lens to the image plane.

The imaging lens according to this embodiment satisfies the following conditional expressions (1) to (4).

$$0.5 < L14/f < 0.8 \quad (1)$$

$$-0.8 < f1/f2 < -0.3 \quad (2)$$

$$-0.3 < f/f34 < -0.05 \quad (3)$$

$$-0.3 < f12/f34 < -0.05 \quad (4)$$

In the above conditional expressions:
f: Focal length of the whole lens system
f1: Focal length of the first lens L1
f2: Focal length of the second lens L2
f12: Composite focal length of the first lens L1 and the second lens L2
f34: Composite focal length of a third lens L3 and a fourth lens L4
L14: Distance on an optical axis from an object-side surface of the first lens L1 to the image-side surface of the fourth lens L4

Moreover, the imaging lens of the embodiment satisfies the following conditional expressions (5) and (6) in addition to the conditional expressions (1) to (4):

$$vd1 > 50 \quad (5)$$

$$vd2 < 30 \quad (6)$$

Furthermore, the imaging lens of the embodiment satisfies the following conditional expression (4A):

$$-0.14 < f12/f34 < -0.05 \quad (4A)$$

When the imaging lens satisfies the conditional expression (4A), it is possible to obtain more satisfactory image-forming performance in spite of a small size thereof, while suitably restraining field curvature within a satisfactory range.

Here, it is not necessary to satisfy all of the conditional expressions (1) to (6) and (4A), and, when any single one of the conditional expressions is individually satisfied, it is possible to obtain an effect corresponding to the respective conditional expression.

According to this embodiment, a lens surface of any lenses, the first lens L1 to the fourth lens L4, is formed as an aspheric surface. When the aspheric surfaces applied to the lens surfaces have an axis Z in a direction of the optical axis, a height H in a direction perpendicular to the optical axis, a conical coefficient k, and aspheric coefficients $A_4$, $A_6$, $A_8$, $A_{10}$, $A_{12}$, $A_{14}$, and $A_{16}$, the aspheric surfaces of the lens surfaces are expressed as follows:

$$Z = \frac{\frac{H^2}{R}}{1 + \sqrt{1-(k+1)\frac{H^2}{R^2}}} + A_4H^4 + A_6H^6 + A_8H^8 + A_{10}H^{10} + A_{12}H^{12} + A_{14}H^{14} + A_{16}H^{16} \quad \text{[Formula 1]}$$

Next, Numerical Data Examples of the embodiment will be described. In each of the Numerical Data Examples, f is a focal length of the whole lens system, Fno represents a F number, and ω represents a half angle of view. In addition, i represents a surface number counted from the object side, R represents a curvature radius, d represents a distance between lens surfaces (surface spacing) on the optical axis, Nd represents a refractive index for a d line, and vd represents Abbe's number for the d line, respectively. Here, aspheric surfaces are indicated with surface numbers i affixed with * (asterisk).

Numerical Data Example 1

Basic lens data are shown below.

| f = 4.708 mm, Fno = 2.850, ω = 31.38° Unit: mm Surface Data | | | | |
|---|---|---|---|---|
| Surface Number i | R | d | Nd | vd |
| (Object) | ∞ | ∞ | | |
| 1 (Stop) | ∞ | 0.0000 | | |
| 2* | 1.798 | 0.6906 | 1.52470 | 56.2 (= vd1) |
| 3* | −4.031 | 0.0800 | | |
| 4* | −2.759 | 0.2800 | 1.61420 | 26.0 (= vd2) |
| 5* | −154.385 | 1.0937 | | |
| 6* | −1.687 | 0.5709 | 1.58500 | 29.0 (= vd3) |
| 7* | −2.002 | 0.0500 | | |
| 8* | 1.418 | 0.5241 | 1.52470 | 56.2 (= vd4) |
| 9* | 1.211 | 0.7000 | | |
| 10 | ∞ | 0.3000 | 1.51633 | 64.12 |
| 11 | ∞ | 0.9933 | | |
| (Image plane) | ∞ | | | | f1 = 2.470
f2 = −4.577
f12 = 4.505
f34 = −33.424
L14 = 3.2893

Aspheric Surface Data

Second Surface k = 1.571017, $A_4$ = −3.342315E−02, $A_6$ = −4.586463E−02,
$A_8$ = 2.730000E−02, $A_{10}$ = −4.766587E−02

-continued

Third Surface k = −2.520942E+01, $A_4$ = −4.909610E−02, $A_6$ = −5.119660E−02,
$A_8$ = 8.254607E−02, $A_{10}$ = −3.449533E−02
Fourth Surface k = −1.059182E−01, $A_4$ = 3.141603E−03, $A_6$ = −2.682348E−02,
$A_8$ = −6.913735E−03, $A_{10}$ = 2.460075E−02, $A_{12}$ = 3.442312E−02,
$A_{14}$ = 6.872702E−03, $A_{16}$ = −4.015291E−02
Fifth Surface k = −4.863359E+04, $A_4$ = −1.262516E−02, $A_6$ = −1.940305E−02,
$A_8$ = −3.192435E−02, $A_{10}$ = 3.606677E−03, $A_{12}$ = 2.010626E−02,
$A_{14}$ = 1.704966E−02, $A_{16}$ = −2.626204E−02
Sixth Surface k = −5.716084, $A_4$ = −9.223254E−02, $A_6$ = −5.833441E−02,
$A_8$ = −5.171274E−02, $A_{10}$ = −7.519929E−02, $A_{12}$ = −3.126697E−02,
$A_{14}$ = 2.246523E−02, $A_{16}$ = 1.403221E−02
Seventh Surface k = 9.654409E−01, $A_4$ = 2.802955E−02, $A_6$ = −8.131358E−04,
$A_8$ = −2.209322E−02, $A_{10}$ = 2.622822E−03, $A_{12}$ = 2.621381E−03,
$A_{14}$ = 1.033431E−03, $A_{16}$ = 5.319060E−04
Eighth Surface k = −3.500065, $A_4$ = −1.424412E−01, $A_6$ = 3.164511E−02,
$A_8$ = 9.201159E−04, $A_{10}$ = −1.043757E−03, $A_{12}$ = −5.199960E−05,
$A_{14}$ = 3.130281E−05, $A_{16}$ = −8.138176E−07
Ninth Surface k = −3.218878, $A_4$ = −1.319913E−01, $A_6$ = 3.749502E−02,
$A_8$ = −5.269001E−03, $A_{10}$ = −2.571854E−04, $A_{12}$ = 1.170692E−04,
$A_{14}$ = 4.428978E−06, $A_{16}$ = −2.562172E−06

The values of the respective conditional expressions are as follows:

L14/f=0.699 f1/f2=−0.540 f/f34=−0.141 f12/f34=−0.135 vd1(=56.2)>50 vd2(=26.0)<30 vd3(=29.0)

vd4(=56.2)

Therefore, the imaging lens in Numerical Data Example 1 satisfies the respective expressions (1) to (6) and (4A).

Figure 2:
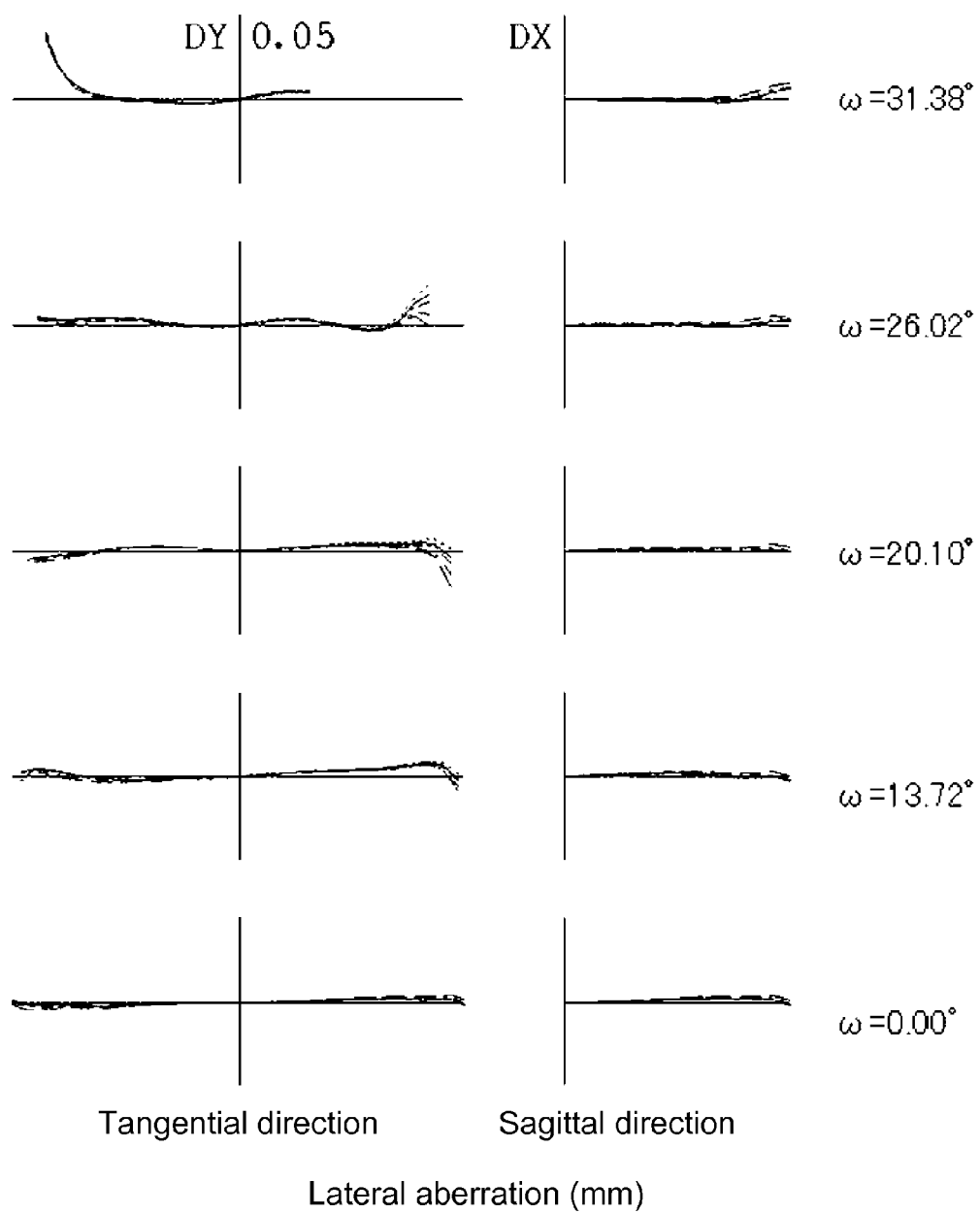
FIG. 2 is an aberration diagram showing a lateral aberration of the imaging lens of Numerical Data Example 1.
Figure 3:
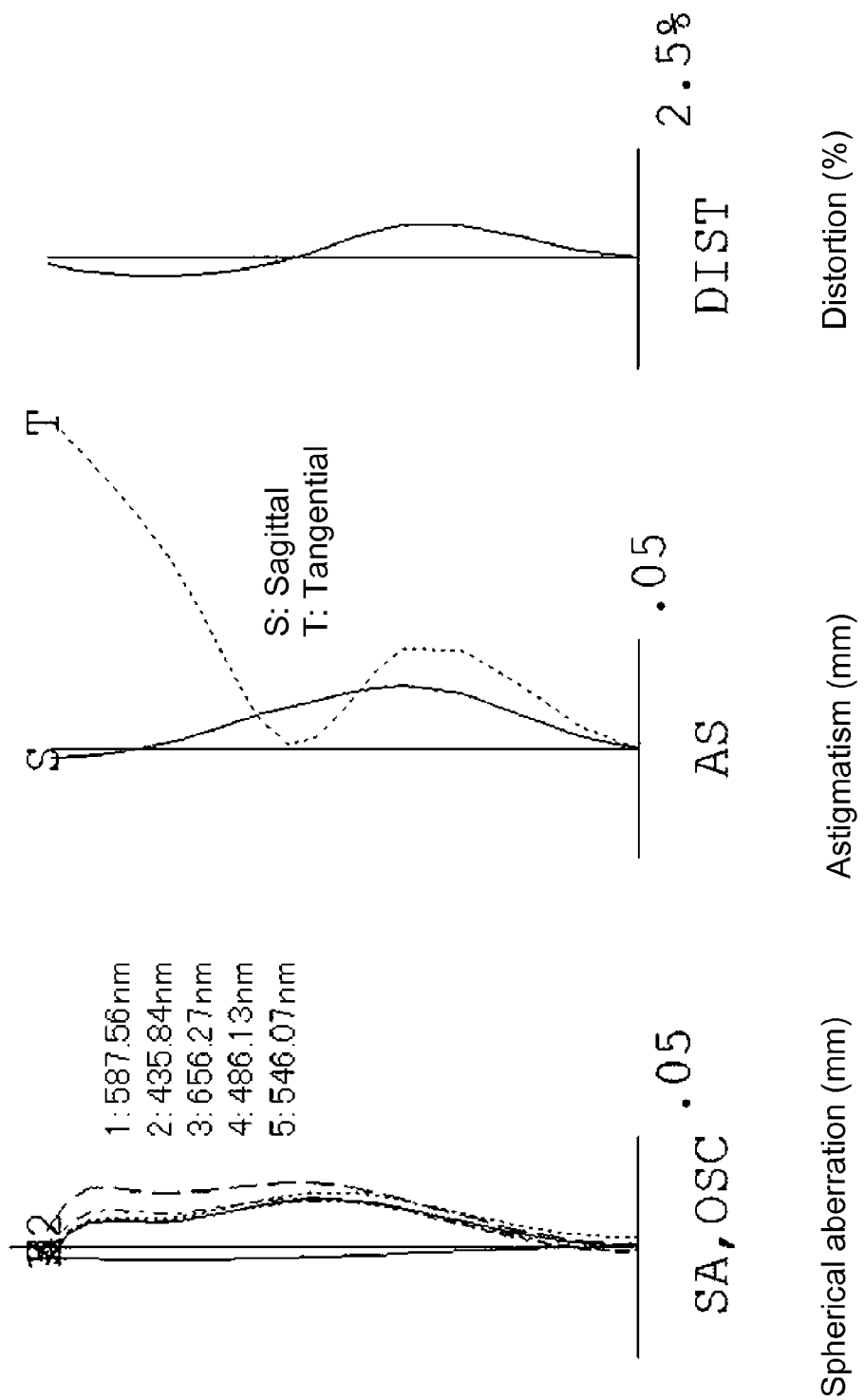
FIG. 3 is an aberration diagram showing a spherical aberration, an astigmatism, and a distortion of the imaging lens of Numerical Data Example 1.
Figure 4:
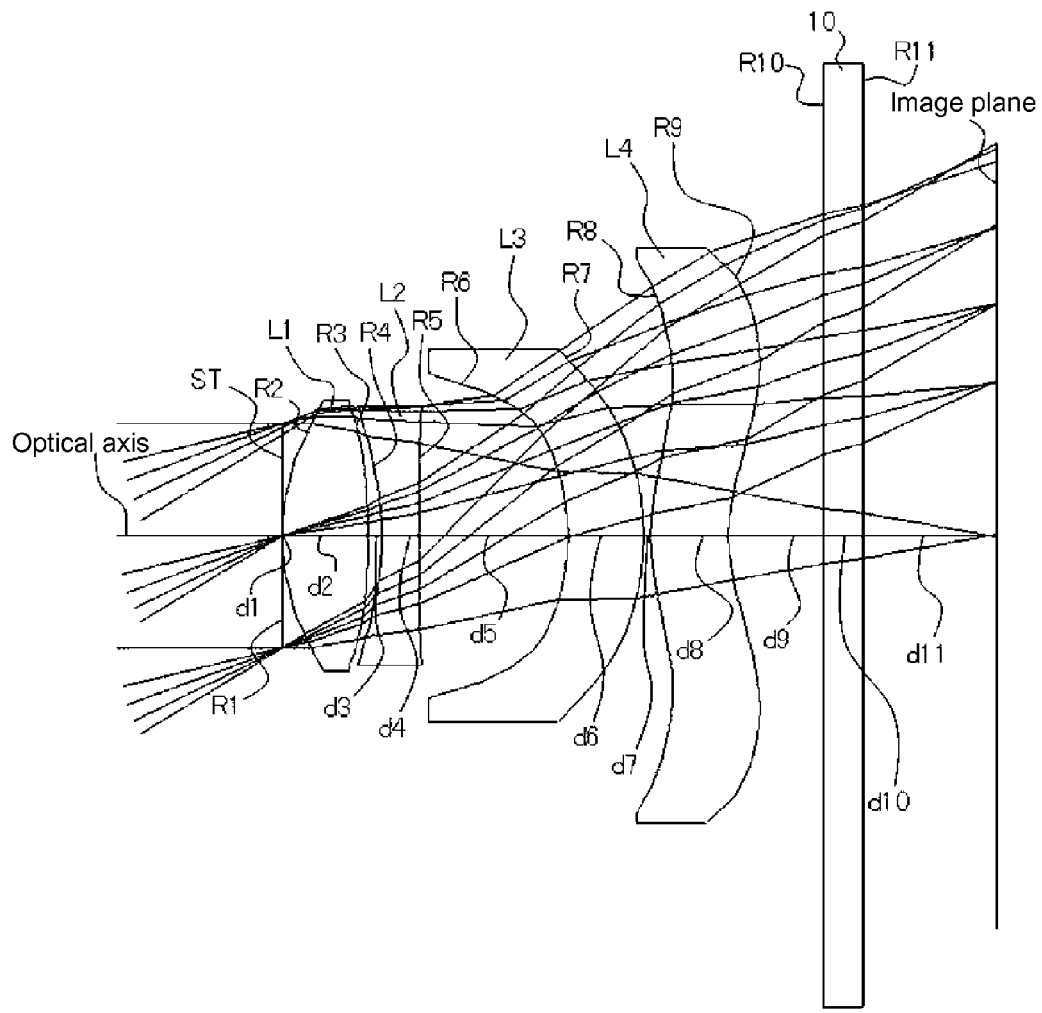
FIG. 4 is a schematic sectional view showing a configuration of an imaging lens in Numerical Data Example 2 according to the embodiment of the invention.

FIG. 2 shows the lateral aberration that corresponds to a half angle of view ω in the imaging lens of Numerical Data Example 1 by dividing into a tangential direction and a sagittal direction (which is also the same in FIGS. 5, 8, 11, 14, and 17). Furthermore, FIG. 3 shows a spherical aberration SA (mm), an astigmatism AS (mm), and a distortion DIST (%) of the imaging lens of Numerical Data Example 1, respectively. In the aberration diagrams, the Offence against the Sine Condition (OSC) is also indicated for the spherical aberration diagram in addition to the aberrations at the respective wavelengths of 587.56 nm, 435.84 nm, 656.27 nm, 486.13 nm, and 546.07 nm. Further, in the astigmatism diagram, the aberration on the sagittal image surface S and the aberration on the tangential image surface T are respectively indicated (which are the same in FIGS. 6, 9, 12, 15, and 18). As shown in FIGS.

2 and 3, in the imaging lens of Numerical Data Example 1, each aberration is satisfactorily corrected.

Numerical Data Example 2

Basic lens data are shown below.

| f = 4.743 mm, Fno = 2.850, ω = 31.20° Unit: mm Surface Data | | | | |
|---|---|---|---|---|
| Surface Number i | R | d | Nd | vd |
| (Object) | ∞ | ∞ | | |
| 1 (Stop) | ∞ | 0.0000 | | |
| 2* | 1.663 | 0.6357 | 1.52470 | 56.2 (= vd1) |
| 3* | −5.760 | 0.1000 | | |
| 4* | −2.631 | 0.2800 | 1.58500 | 29.0 (= vd2) |
| 5* | −100.000 | 1.0989 | | |
| 6* | −1.682 | 0.5597 | 1.58500 | 29.0 (= vd3) |
| 7* | −1.943 | 0.0500 | | |
| 8* | 1.530 | 0.5772 | 1.52470 | 56.2 (= vd4) |
| 9* | 1.301 | 0.7000 | | |
| 10 | ∞ | 0.3000 | 1.51633 | 64.12 |
| 11 | ∞ | 0.9908 | | |
| (Image plane) | ∞ | | | | f1 = 2.534
f2 = −4.624
f12 = 4.653
f34 = −49.454
L14 = 3.3015

Aspheric Surface Data

Second Surface $k = 1.158218, A_4 = -2.443693E-02, A_6 = -4.392440E-02,$
$A_8 = 5.723048E-02, A_{10} = -9.506118E-02$ Third Surface $k = -4.790985E+01, A_4 = -4.674993E-02, A_6 = -8.525632E-02,$
$A_8 = 3.374960E-02, A_{10} = 1.214815E-02$ Fourth Surface $k = 0.000000, A_4 = 6.144210E-03, A_6 = -7.089520E-02,$
$A_8 = 2.941188E-03, A_{10} = 7.248592E-02, A_{12} = 5.730934E-02,$
$A_{14} = -9.076456E-03, A_{16} = -3.704716E-02$ Fifth Surface $k = 0.000000, A_4 = 2.446296E-02, A_6 = -1.100040E-02,$
$A_8 = -2.055485E-02, A_{10} = 1.198287E-02, A_{12} = 5.167391E-02,$
$A_{14} = 4.259750E-02, A_{16} = -7.234741E-02$ Sixth Surface $k = -7.371656, A_4 = -1.006393E-01, A_6 = -6.249011E-02,$
$A_8 = -2.699109E-02, A_{10} = -5.240785E-02, A_{12} = -2.755751E-02,$
$A_{14} = 1.471831E-02, A_{16} = 7.613020E-03$ Seventh Surface $k = 7.772284E-01, A_4 = 2.372029E-02, A_6 = -8.258576E-04,$
$A_8 = -2.139467E-02, A_{10} = 2.494698E-03, A_{12} = 2.103248E-03,$
$A_{14} = 7.043756E-04, A_{16} = 5.062604E-04$ Eighth Surface $k = -3.766188, A_4 = -1.368176E-01, A_6 = 3.151324E-02,$
$A_8 = 5.962702E-04, A_{10} = -1.075255E-03, A_{12} = -4.577329E-05,$
$A_{14} = 3.324458E-05, A_{16} = -1.178042E-06$ Ninth Surface $k = -2.969849, A_4 = -1.365649E-01, A_6 = 4.018573E-02,$
$A_8 = -5.391275E-03, A_{10} = -3.644221E-04, A_{12} = 1.206243E-04,$
$A_{14} = -7.498908E-06, A_{16} = -2.564202E-06$ The values of the respective conditional expressions are as follows:

$L14/f=0.696$ $f1/f2=-0.548$ $f/f34=-0.096$ $f12/f34=-0.094$ $vd1(=56.2)>50$ $vd2(=29.0)<30$ $vd3(=29.0)=vd2$ $vd4(=56.2)=vd1$

Therefore, the imaging lens in Numerical Data Example 2 satisfies the respective expressions (1) to (6) and (4A).

In addition, the imaging lens of Numerical Data Example 2 also satisfies the following conditional expressions (7) and (8):

$$vd1=vd4 \quad (7)$$

$$vd2=vd3 \quad (8)$$

When the imaging lens satisfies the conditional expressions (7) and (8), it is possible to satisfactorily correct the axial chromatic aberration and the off-axis chromatic aberration of magnification.

Figure 5:
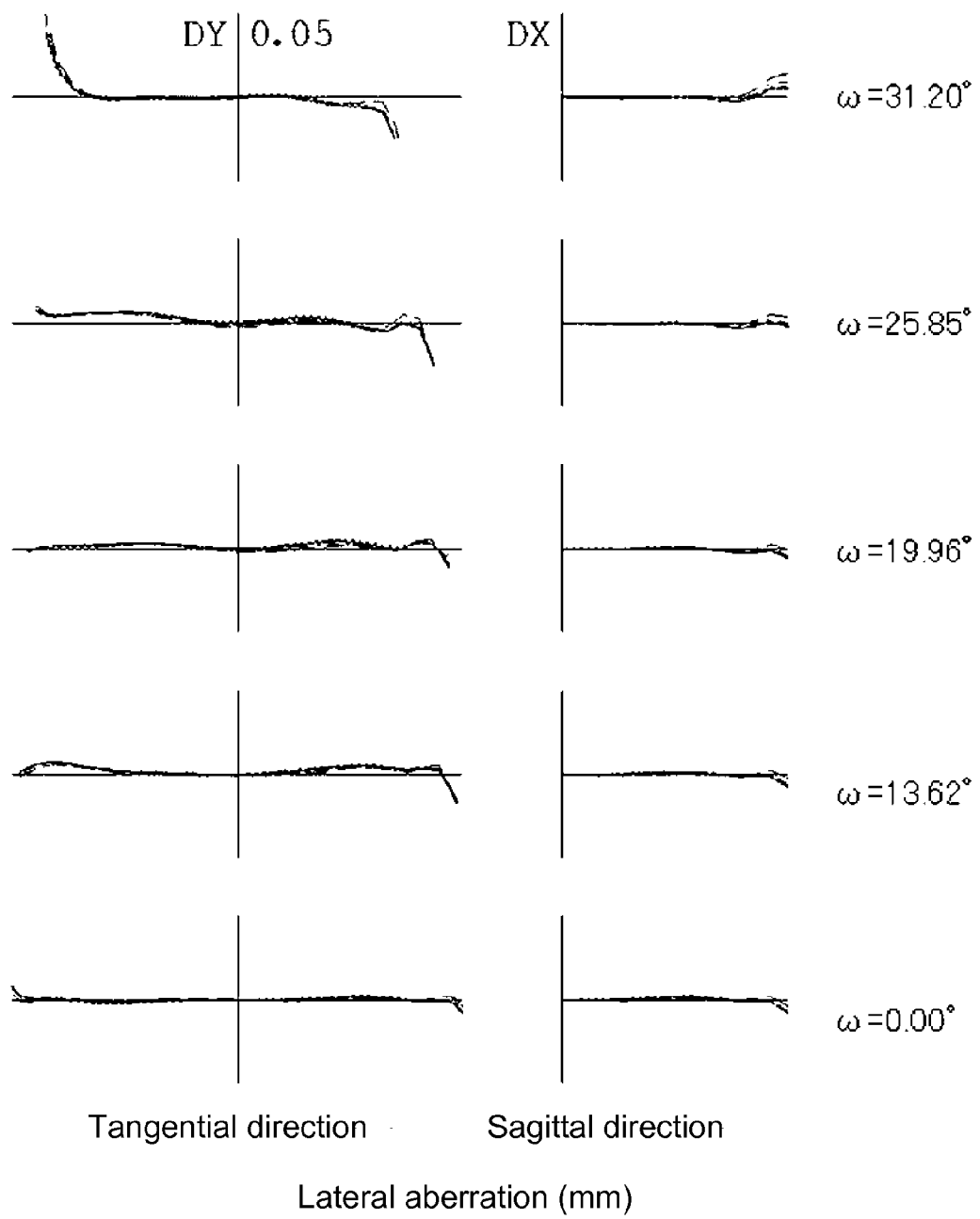
FIG. 5 is an aberration diagram showing a lateral aberration of the imaging lens of Numerical Data Example 2.
Figure 6:
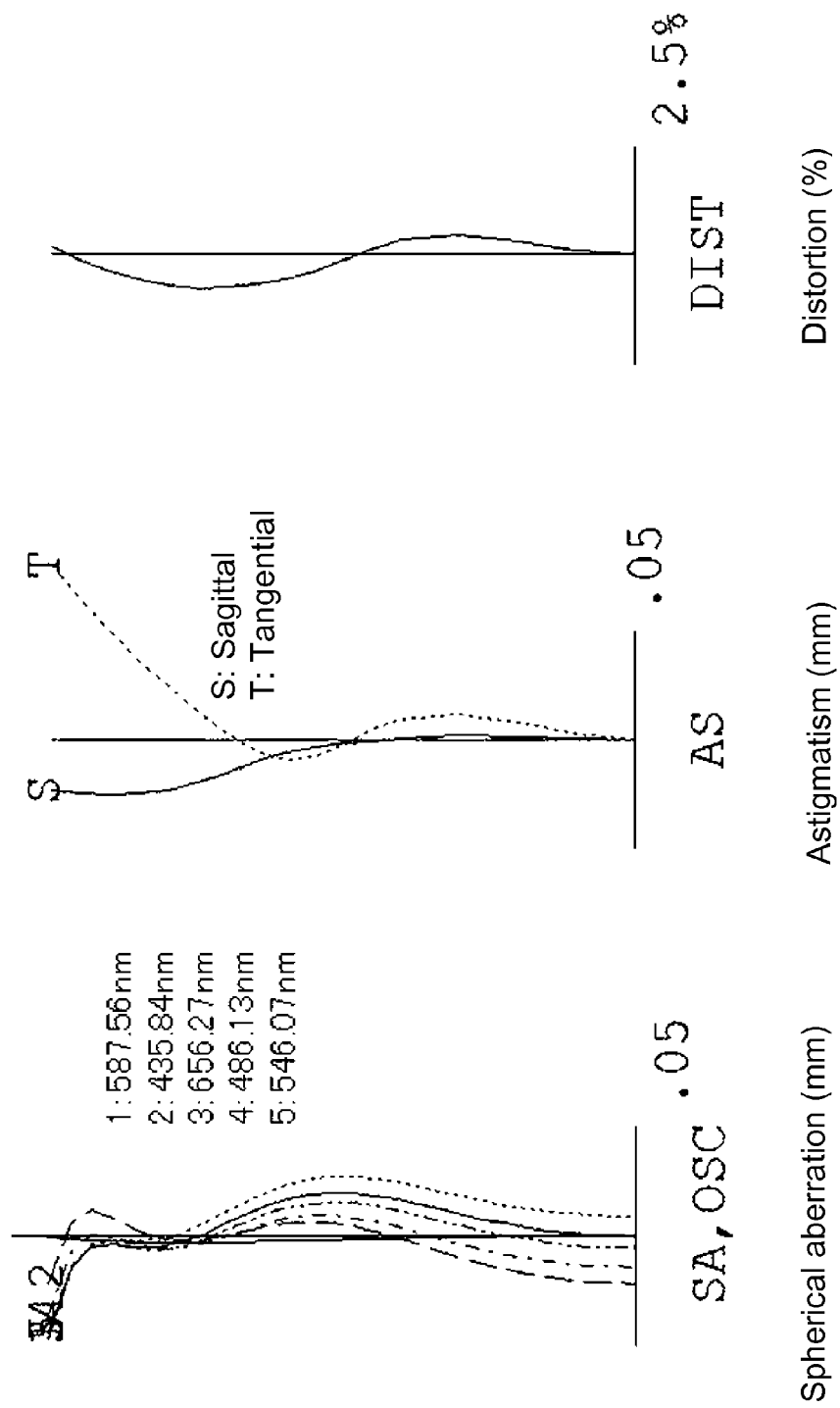
FIG. 6 is an aberration diagram showing a spherical aberration, an astigmatism, and a distortion of the imaging lens of Numerical Data Example 2.
Figure 7:
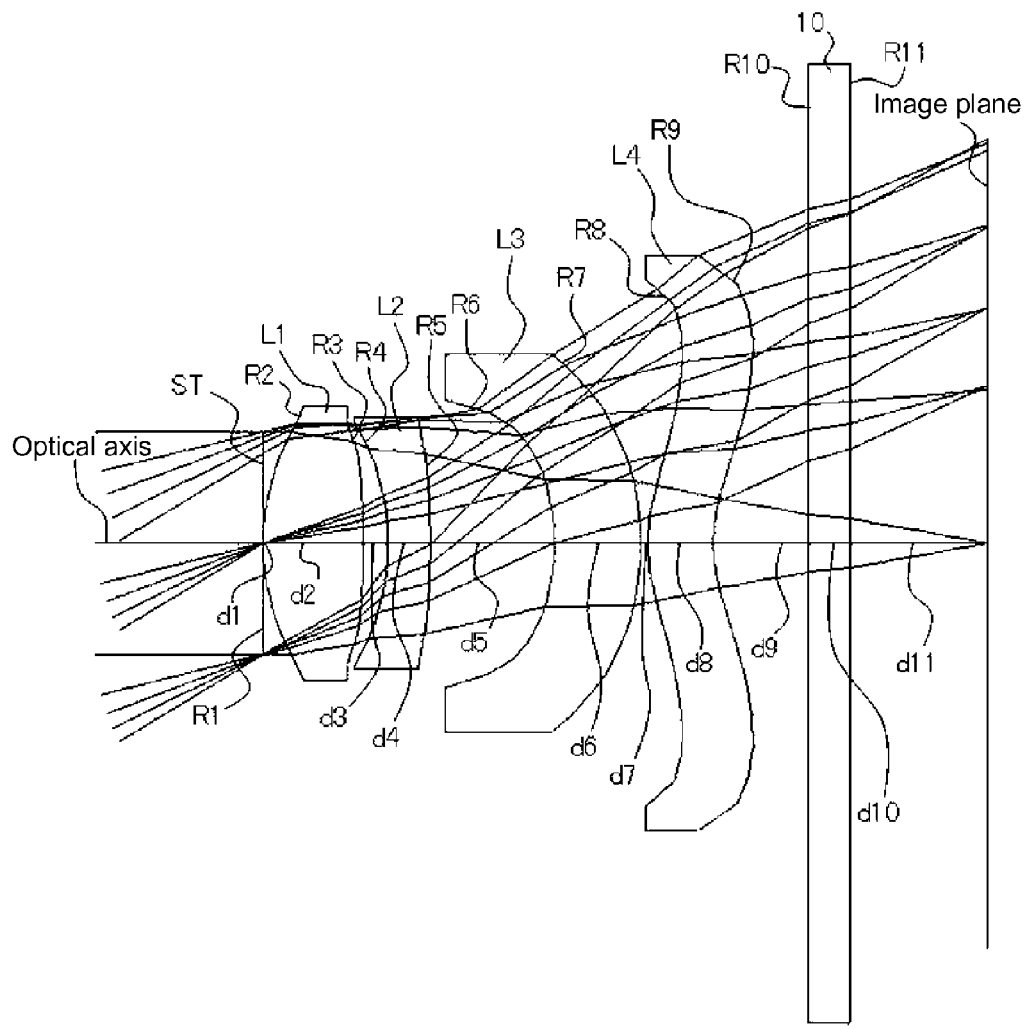
FIG. 7 is a schematic sectional view showing a configuration of an imaging lens in Numerical Data Example 3 according to the embodiment of the invention.

FIG. 5 shows the lateral aberration that corresponds to a half angle of view ω in the imaging lens of Numerical Data Example 2. Furthermore, FIG. 6 shows a spherical aberration SA (mm), an astigmatism AS (mm), and a distortion DIST (%) of the imaging lens, respectively. As shown in FIGS. 5 and 6, in the imaging lens of Numerical Data Example 2, image surface is satisfactorily corrected and each aberration is suitably corrected, similarly to Numerical Data Example 1.

Numerical Data Example 3

| f = 4.645 mm, Fno = 2.850, ω = 31.73° Unit: mm Surface Data | | | | |
|---|---|---|---|---|
| Surface Number i | R | d | Nd | vd |
| (Object) | ∞ | ∞ | | |
| 1 (Stop) | ∞ | 0.0000 | | |
| 2* | 1.663 | 0.7331 | 1.52470 | 56.2 (= vd1) |
| 3* | −6.029 | 0.1748 | | |
| 4 | −1.767 | 0.3141 | 1.61420 | 26.0 (= vd2) |
| 5 | −4.369 | 0.8962 | | |
| 6* | −1.636 | 0.6362 | 1.58470 | 29.0 (= vd3) |
| 7* | −1.925 | 0.0500 | | |
| 8* | 1.300 | 0.4724 | 1.52470 | 56.2 (= vd4) |
| 9* | 1.116 | 0.7000 | | |
| 10 | ∞ | 0.3000 | 1.51633 | 64.12 |
| 11 | ∞ | 1.0047 | | |
| (Image plane) | ∞ | | | | f1 = 2.568
f2 = −5.063

-continued $$f12 = 4.453$$
$$f34 = -48.997$$
$$L14 = 3.2768$$

Aspheric Surface Data

Second Surface $k = 3.270325E-01, A_4 = -2.963646E-03, A_6 = -4.917528E-02,$
$A_8 = 9.754150E-02, A_{10} = -1.004564E-01$
Third Surface $k = -8.039746, A_4 = -5.150944E-02, A_6 = -5.247068E-02,$
$A_8 = 3.278602E-02, A_{10} = -5.914838E-02$
Sixth Surface $k = -6.283229, A_4 = -1.582275E-01, A_6 = -2.449629E-02,$
$A_8 = -1.052557E-01, A_{10} = -1.038348E-01, A_{12} = 4.941694E-02,$
$A_{14} = 8.339438E-02, A_{16} = -1.131806E-01$
Seventh Surface $k = 2.360634E-01, A_4 = 9.188514E-03, A_6 = -2.048402E-03,$
$A_8 = -2.086958E-02, A_{10} = 7.115067E-03, A_{12} = 1.389927E-03,$
$A_{14} = -1.191326E-03, A_{16} = 5.152975E-04$
Eighth Surface $k = -3.139332, A_4 = -1.388668E-01, A_6 = 4.335681E-02,$
$A_8 = -2.127754E-03, A_{10} = -1.657294E-03, A_{12} = 7.108948E-05,$
$A_{14} = 7.601098E-05, A_{16} = -1.436767E-05$
Ninth Surface $k = -3.152212, A_4 = -1.258348E-01, A_6 = 3.649518E-02,$
$A_8 = -3.777574E-03, A_{10} = -5.465368E-04, A_{12} = 6.847761E-05,$
$A_{14} = 2.155501E-05, A_{16} = -4.608296E-06$ The values of the respective conditional expressions are as follows:

$L14/f = 0.705$ $f1/f2 = -0.507$ $f/f34 = -0.095$ $f12/f34 = -0.091$ $vd1(=56.2) > 50$ $vd2(=26.0) < 30$ $vd3(=29.0)$ $vd4(=56.2)$

Therefore, the imaging lens in Numerical Data Example 3 satisfies the respective expressions (1)-(6) and (4A).

Furthermore, the imaging lens of Numerical Data Example 3 has both an object-side surface and an image-side surface of the second lens L2 formed as spherical surfaces. Therefore, it is possible to effectively restrain deterioration of the image-forming performance such as de-centering (axial displacement) or tilting, and the like of the first lens L1, which has strong refractive power.

Figure 8:
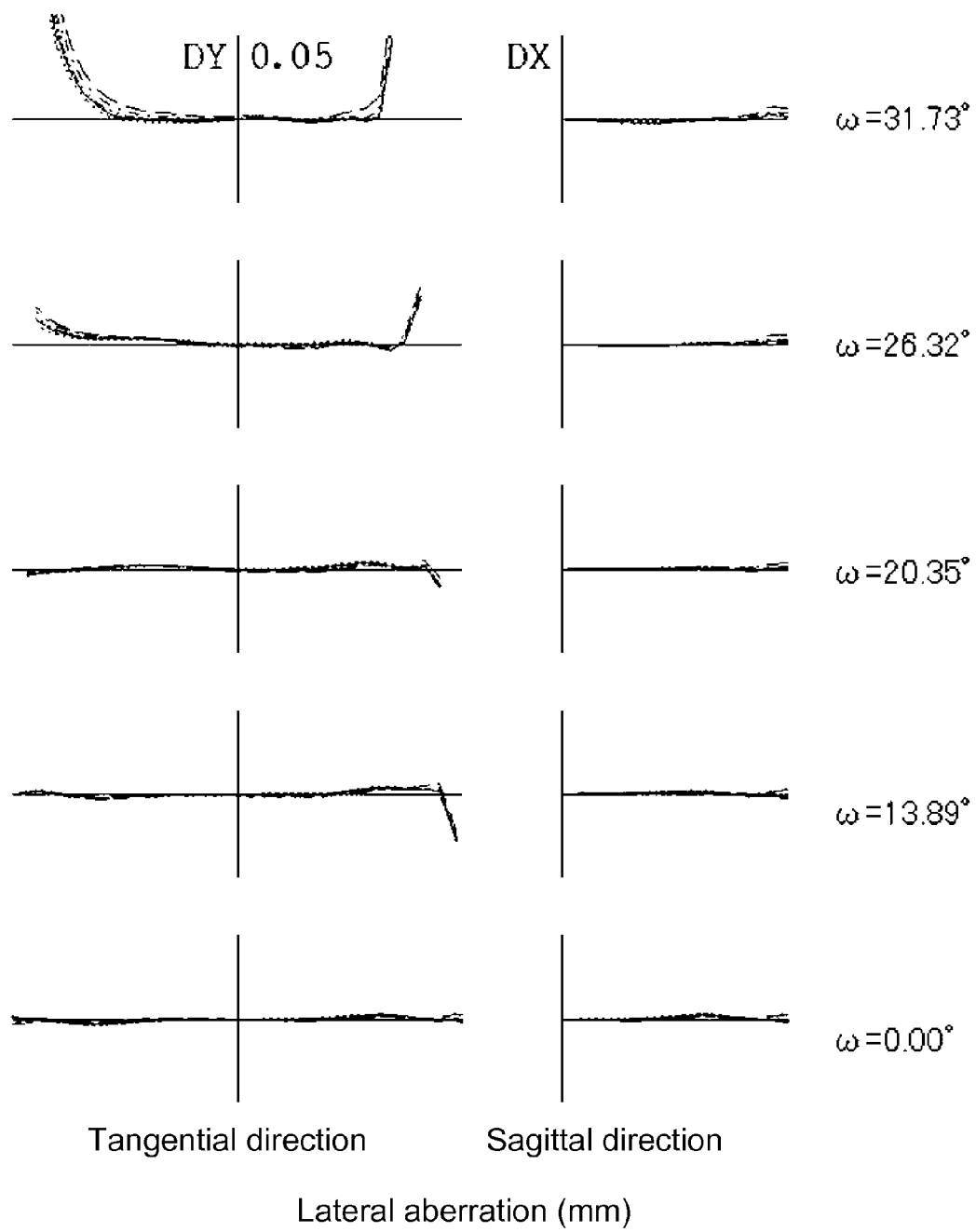
FIG. 8 is an aberration diagram showing a lateral aberration of the imaging lens of Numerical Data Example 3.
Figure 9:
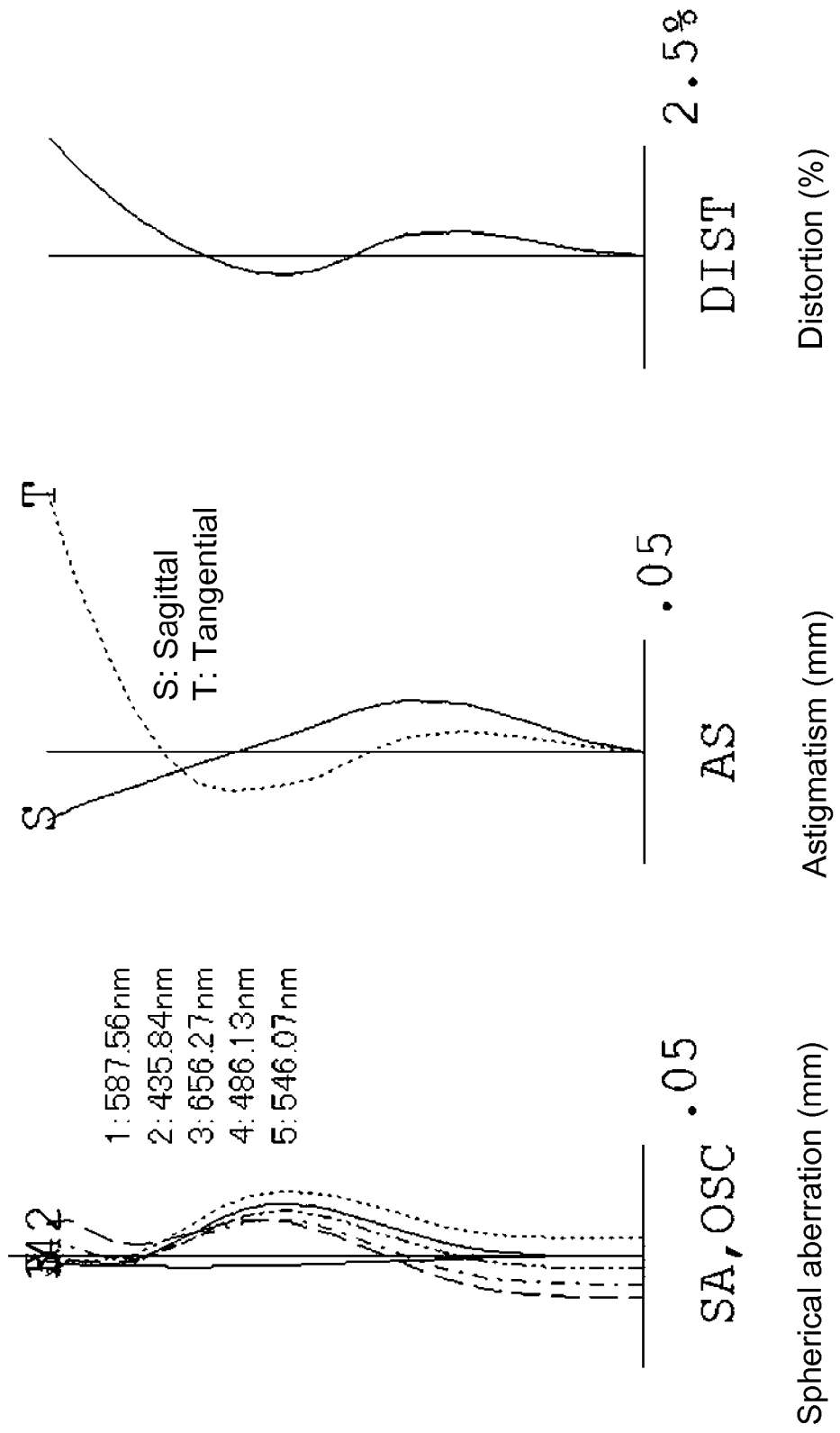
FIG. 9 is an aberration diagram showing a spherical aberration, an astigmatism, and a distortion of the imaging lens of Numerical Data Example 3.
Figure 10:
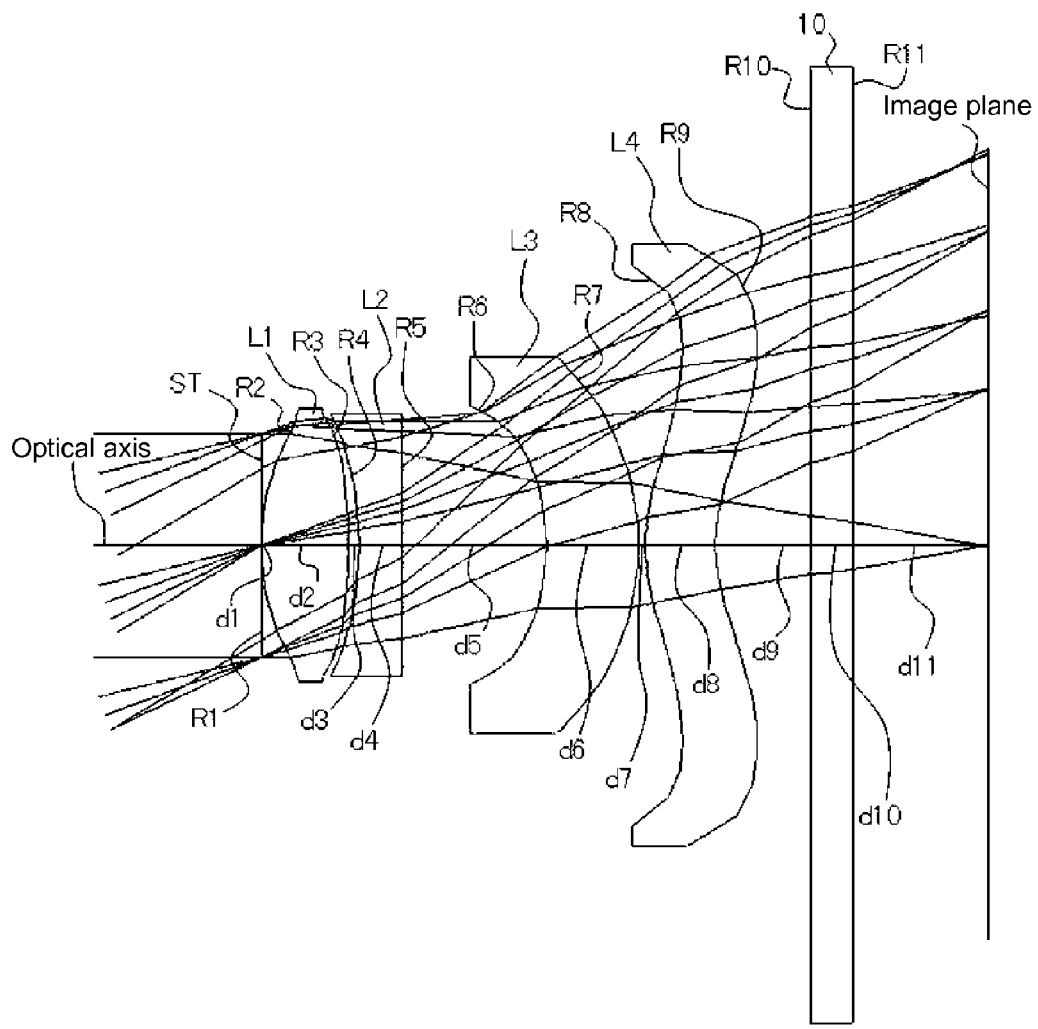
FIG. 10 is a schematic sectional view showing a configuration of an imaging lens in Numerical Data Example 4 according to the embodiment of the invention.

FIG. 8 shows the lateral aberration that corresponds to a half angle of view ω in the imaging lens of Numerical Data Example 3. Furthermore, FIG. 9 shows a spherical aberration SA (mm), an astigmatism AS (mm), and a distortion DIST (%) of the imaging lens, respectively. As shown in FIGS. 8 and 9, also in the imaging lens of Numerical Data Example 3, image surface is satisfactorily corrected and each aberration is suitably corrected, similarly to Numerical Data Example 1.

Numerical Data Example 4

Basic lens data are shown below.

$f = 4.654$ mm, Fno = 2.850, ω = 31.68°
Unit: mm

Surface Data

| Surface Number i | R | d | Nd | vd |
|---|---|---|---|---|
| (Object) | ∞ | ∞ | | |
| 1 (Stop) | ∞ | 0.0000 | | |
| 2* | 1.695 | 0.6338 | 1.52470 | 56.2 (= vd1) |
| 3* | -3.839 | 0.0800 | | |
| 4 | -2.363 | 0.3089 | 1.58500 | 29.0 (= vd2) |
| 5 | -106.518 | 1.0497 | | |
| 6* | -1.593 | 0.6699 | 1.58500 | 29.0 (= vd3) |
| 7* | -1.892 | 0.0500 | | |
| 8* | 1.358 | 0.5015 | 1.52470 | 56.2 (= vd4) |
| 9* | 1.161 | 0.7000 | | |
| 10 | ∞ | 0.3000 | 1.51633 | 64.12 |
| 11 | ∞ | 0.9961 | | |
| (Image plane) | ∞ | | | |

$$f1 = 2.333$$
$$f2 = -4.135$$
$$f12 = 4.429$$
$$f34 = -47.781$$
$$L14 = 3.2938$$

Aspheric Surface Data

Second Surface $k = 4.198477E-01, A_4 = 1.181523E-03, A_6 = -6.495178E-02,$
$A_8 = 1.363026E-01, A_{10} = -1.374222E-01$
Third Surface $k = -1.297813E+01, A_4 = -4.268352E-02, A_6 = -4.601343E-02,$
$A_8 = 7.908415E-02, A_{10} = -9.983359E-02$
Sixth Surface $k = -4.565055, A_4 = -1.221993E-01, A_6 = 1.937259E-02,$
$A_8 = -9.214001E-02, A_{10} = -1.103217E-01, A_{12} = 4.127733E-02,$
$A_{14} = 9.204231E-02, A_{16} = -8.709760E-02$
Seventh Surface $k = -1.343932E-02, A_4 = 7.209626E-03, A_6 = 2.324196E-02,$
$A_8 = -2.653377E-02, A_{10} = 2.967600E-03, A_{12} = 1.794455E-03,$
$A_{14} = -1.748302E-04, A_{16} = 1.351646E-04$
Eighth Surface $k = -1.949071, A_4 = -1.509605E-01, A_6 = 3.938322E-02,$
$A_8 = -3.884382E-04, A_{10} = -1.294363E-03, A_{12} = -5.706405E-05,$
$A_{14} = 2.970576E-05, A_{16} = -2.176238E-07$
Ninth Surface $k = -2.201525, A_4 = -1.448507E-01, A_6 = 3.944284E-02,$
$A_8 = -3.444687E-03, A_{10} = -5.280442E-04, A_{12} = 4.557904E-05,$
$A_{14} = 1.223691E-05, A_{16} = -1.966983E-06$ The values of the respective conditional expressions are as follows:

$L14/f = 0.708$ $f1/f2 = -0.564$ $f/f34 = -0.097$ $f12/f34 = -0.093$ $vd1(=56.2) > 50$ $vd2(=29.0) < 30$ $vd3(=29.0)=vd2$ $vd4(=56.2)=vd1$

Therefore, the imaging lens in Numerical Data Example 4 satisfies the respective expressions (1) to (8) and (4A). Furthermore, in the imaging lens of Numerical Data Example 4, both an object-side surface and an image-side surface of the second lens L2 are formed as spherical surfaces, similarly to the imaging lens of Numerical Data Example 3.

Figure 11:
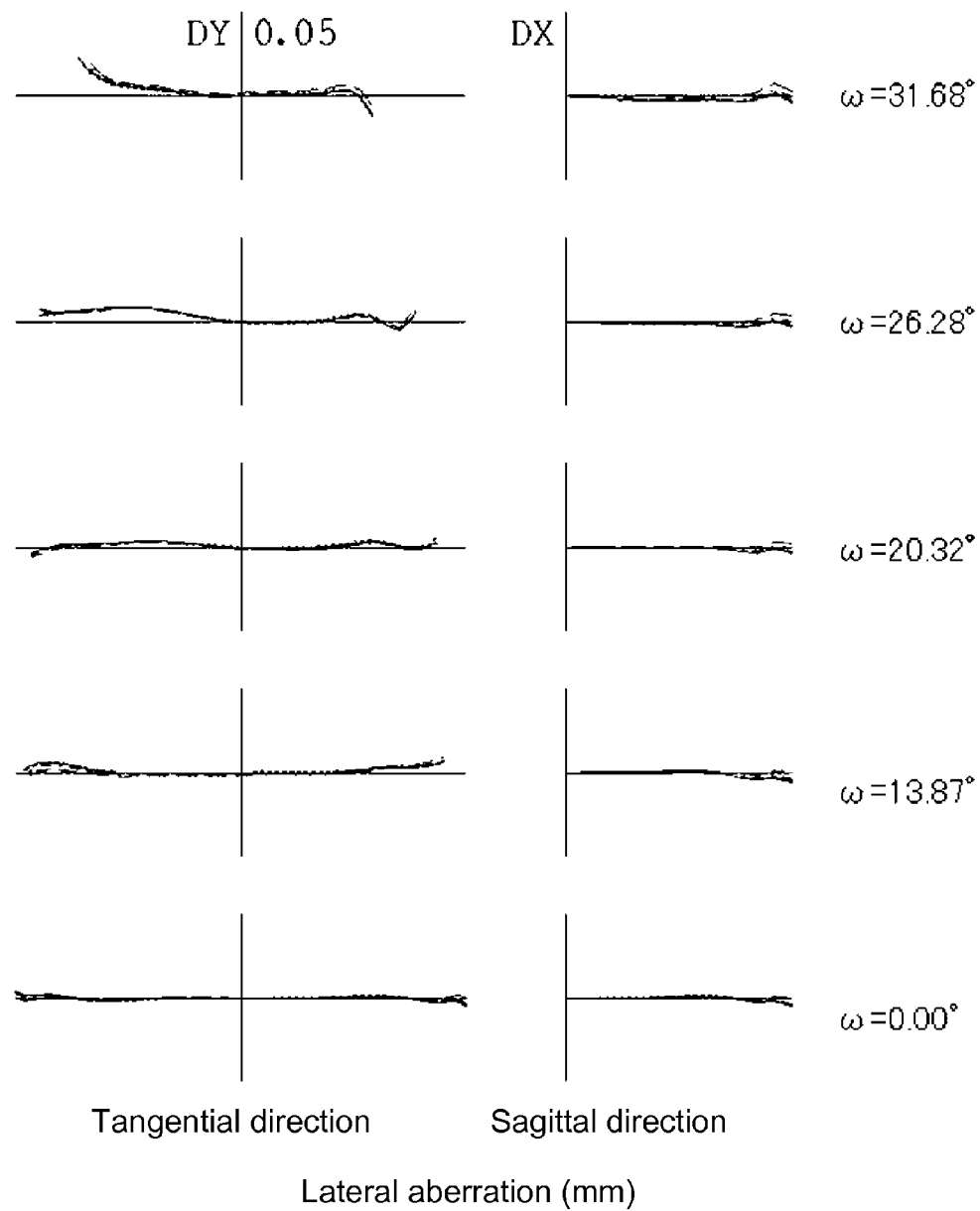
FIG. 11 is an aberration diagram showing a lateral aberration of the imaging lens of Numerical Data Example 4.
Figure 12:
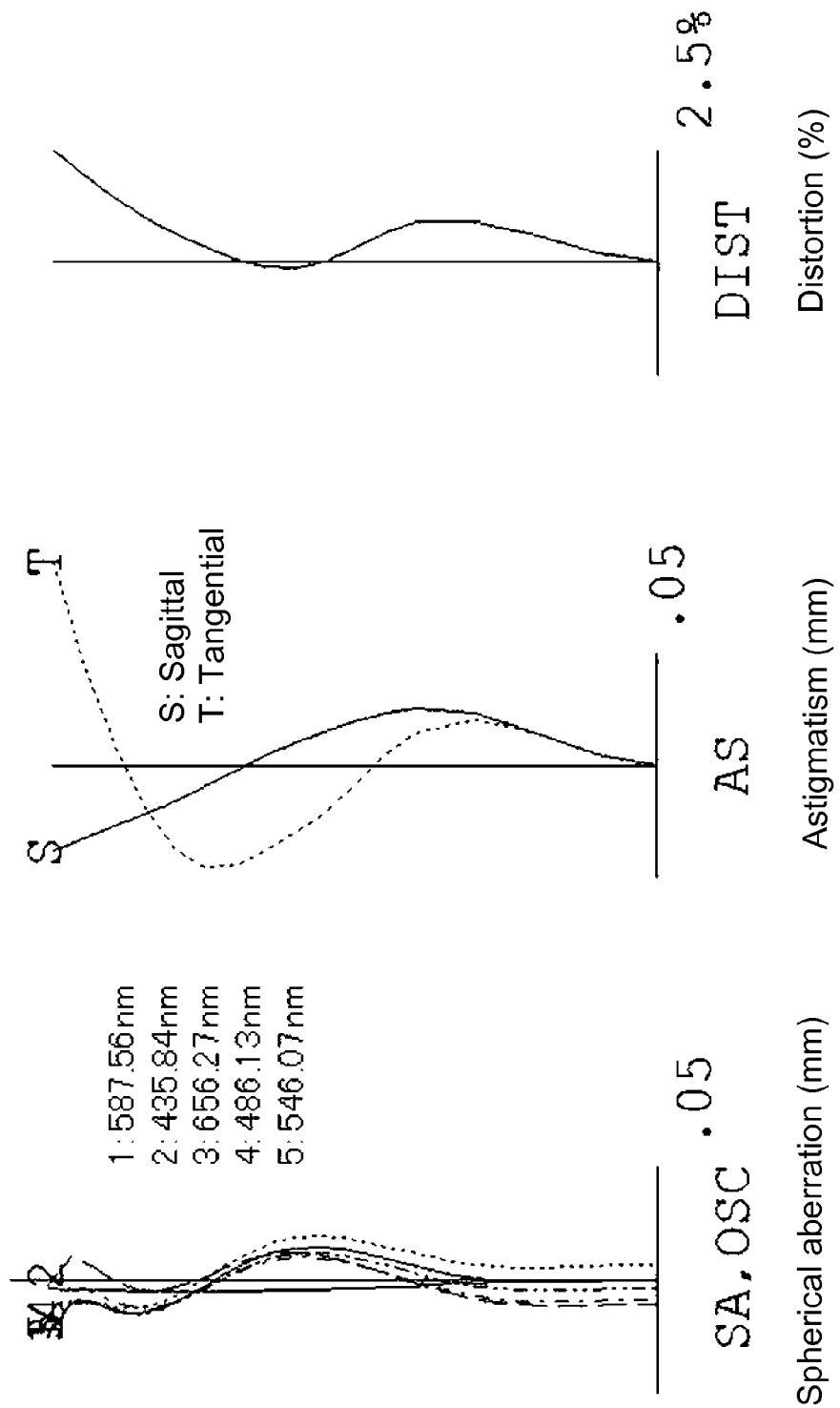
FIG. 12 is an aberration diagram showing a spherical aberration, an astigmatism, and a distortion of the imaging lens of Numerical Data Example 4.
Figure 13:
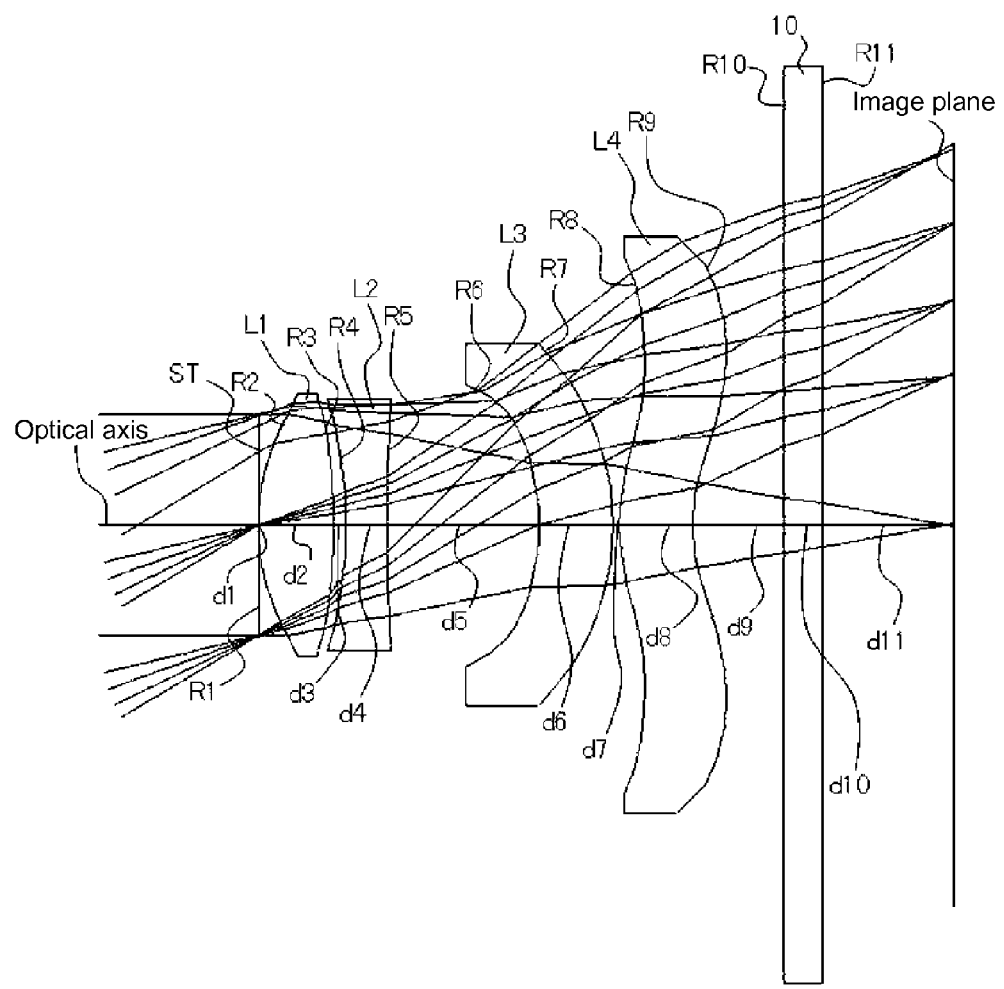
FIG. 13 is a schematic sectional view showing a configuration of an imaging lens in Numerical Data Example 5 according to the embodiment of the invention.

FIG. 11 shows the lateral aberration that corresponds to a half angle of view ω in the imaging lens of Numerical Data Example 4. Furthermore, FIG. 12 shows a spherical aberration SA (mm), an astigmatism AS (mm), and a distortion DIST (%) of the imaging lens, respectively. As shown in FIGS. 11 and 12, also in the imaging lens of Numerical Data Example 4, each aberration is satisfactorily corrected.

Numerical Data Example 5

Basic lens data are shown below.

| f = 4.798 mm, Fno = 2.800, ω = 30.90° Unit: mm Surface Data | | | | |
|---|---|---|---|---|
| Surface Number i | R | d | Nd | vd |
| (Object) | ∞ | ∞ | | |
| 1 (Stop) | ∞ | 0.0000 | | |
| 2* | 1.699 | 0.5690 | 1.52470 | 56.2 (= vd1) |
| 3* | −5.293 | 0.1000 | | |
| 4 | −3.408 | 0.3089 | 1.58500 | 29.0 (= vd2) |
| 5 | 11.287 | 1.1659 | | |
| 6* | −1.697 | 0.5610 | 1.58500 | 29.0 (= vd3) |
| 7* | −1.958 | 0.0500 | | |
| 8* | 1.390 | 0.5596 | 1.52470 | 56.2 (= vd4) |
| 9* | 1.173 | 0.7000 | | |
| 10 | ∞ | 0.3000 | 1.51633 | 64.12 |
| 11 | ∞ | 0.9914 | | |
| (Image plane) | ∞ | | | |

| f1 = 2.522 |
| f2 = −4.440 |
| f12 = 4.757 |
| f34 = −50.305 |
| L14 = 3.3144 |

Aspheric Surface Data

Second Surface $k = 4.749279E-01, A_4 = 3.476760E-04, A_6 = -6.356825E-02,$
$A_8 = 1.175342E-01, A_{10} = -1.011567E-01$
Third Surface $k = -4.156986E+01, A_4 = -2.684020E-02, A_6 = -3.75827E-02,$
$A_8 = 8.237750E-02, A_{10} = -8.343967E-02$
Sixth Surface $k = -9.739629, A_4 = -1.223769E-01, A_6 = 2.995828E-02,$
$A_8 = -5.331111E-02, A_{10} = -9.433028E-02, A_{12} = 1.673157E-02,$
$A_{14} = 6.532112E-02, A_{16} = -4.486481E-02$
Seventh Surface $k = 2.161561E-01, A_4 = 2.297158E-02, A_6 = 1.518263E-02,$
$A_8 = -2.936526E-02, A_{10} = 3.163314E-03, A_{12} = 2.745350E-03,$
$A_{14} = 2.635187E-04, A_{16} = -2.468953E-05$
Eighth Surface $k = -3.207069, A_4 = -1.521974E-01, A_6 = 4.057291E-02,$
$A_8 = -4.701675E-05, A_{10} = -1.260621E-03, A_{12} = -3.692410E-05,$
$A_{14} = 3.763761E-05, A_{16} = -1.774216E-06$ -continued Ninth Surface $k = -2.976996, A_4 = -1.374443E-01, A_6 = 3.695446E-02,$
$A_8 = -3.644394E-03, A_{10} = -3.609778E-04, A_{12} = 6.578660E-05,$
$A_{14} = 5.918320E-06, A_{16} = -1.434863E-06$ The values of the respective conditional expressions are as follows:

$L14/f=0.691$ $f1/f2=-0.568$ $f/f34=-0.095$ $f12/f34=-0.095$ $vd1(=56.2)>50$ $vd2(=29.0)<30$ $vd3(=29.0)=vd2$ $vd4(=56.2)=vd1$

Therefore, the imaging lens in Numerical Data Example 5 satisfies the respective expressions (1) to (8) and (4A). Furthermore, also in the imaging lens of Numerical Data Example 5, both an object-side surface and an image-side surface of the second lens L2 are formed as spherical surfaces, similarly to the imaging lens of Numerical Data Example 3.

Figure 14:
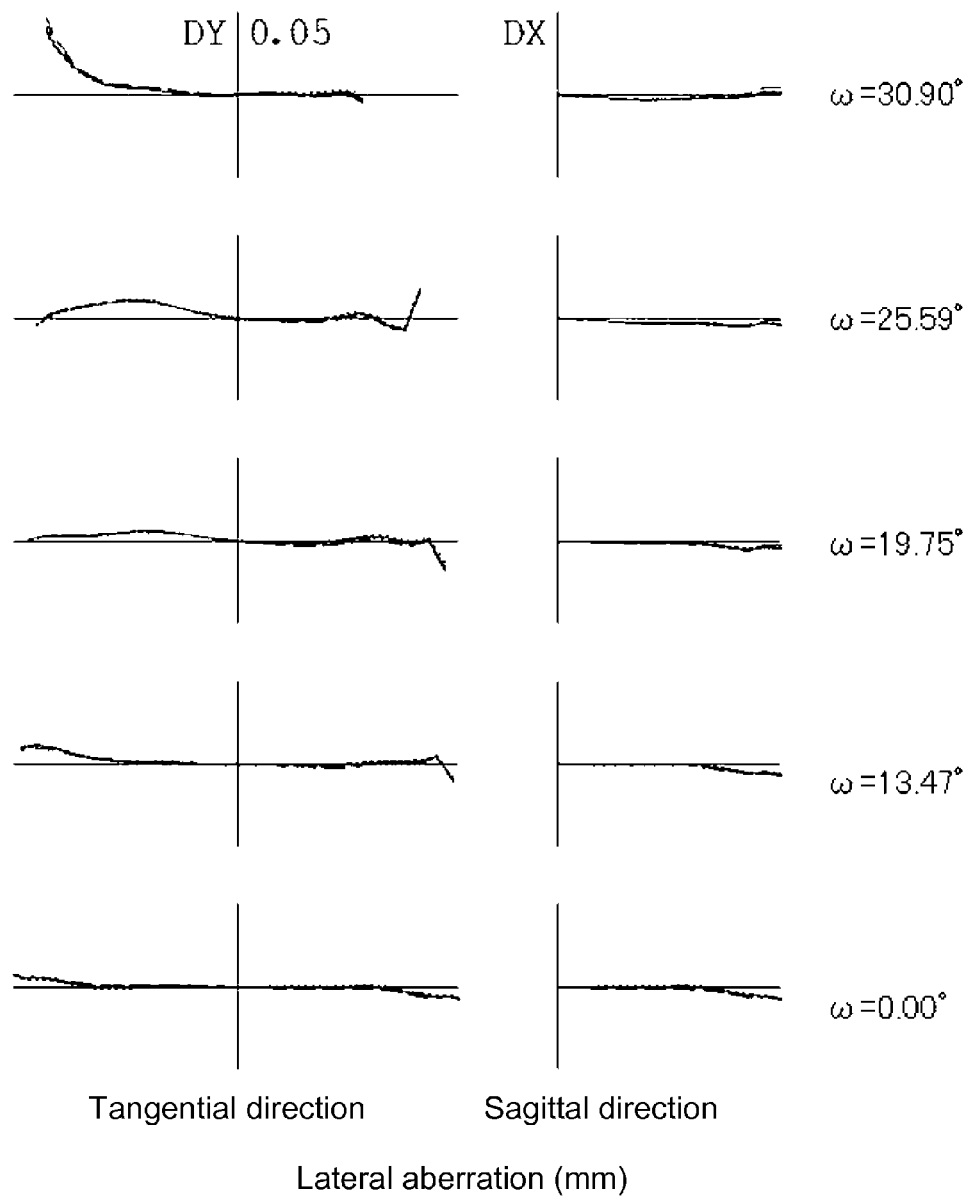
FIG. 14 is an aberration diagram showing a lateral aberration of the imaging lens of Numerical Data Example 5.
Figure 15:
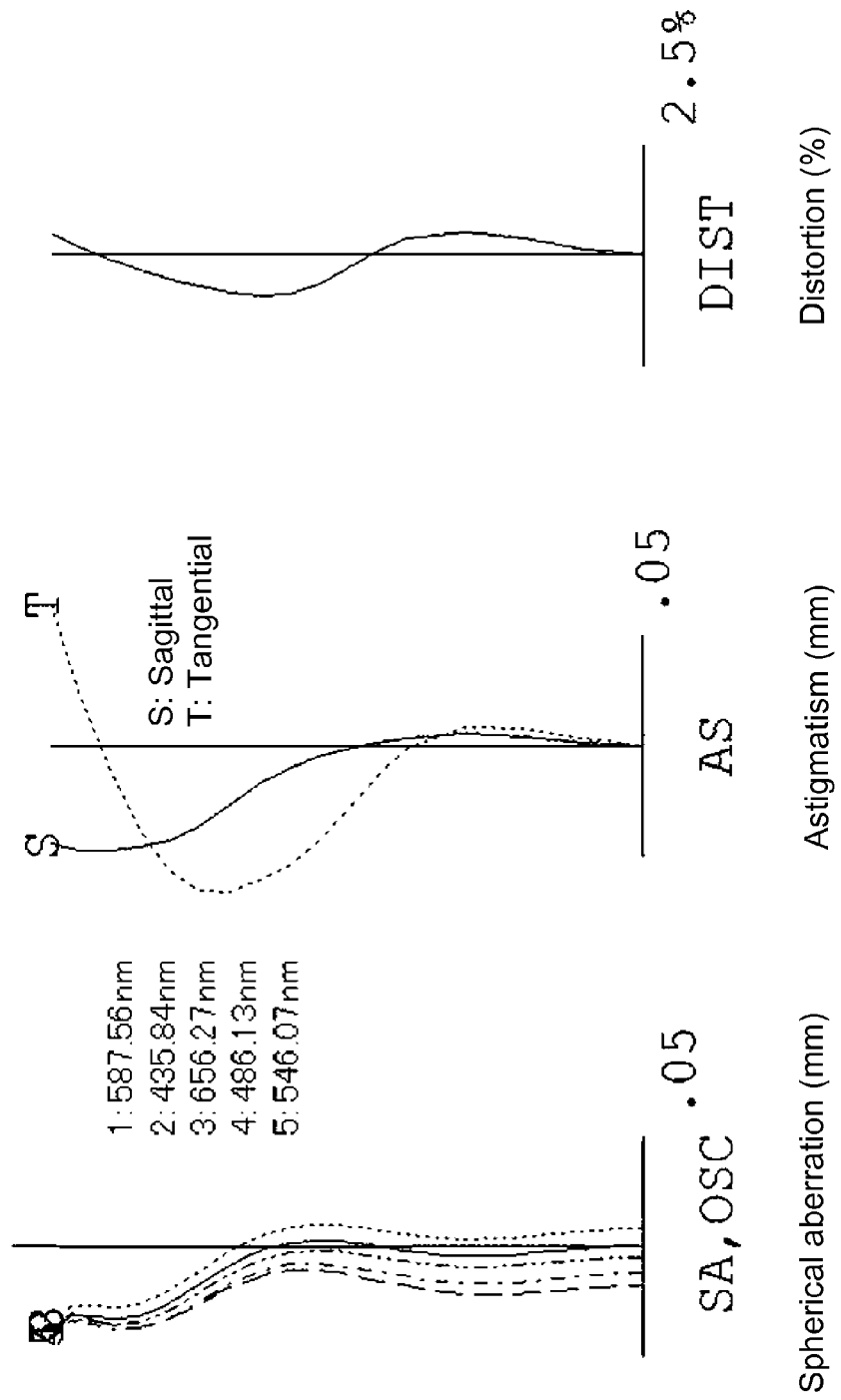
FIG. 15 is an aberration diagram showing a spherical aberration, an astigmatism, and a distortion of the imaging lens of Numerical Data Example 5.
Figure 16:
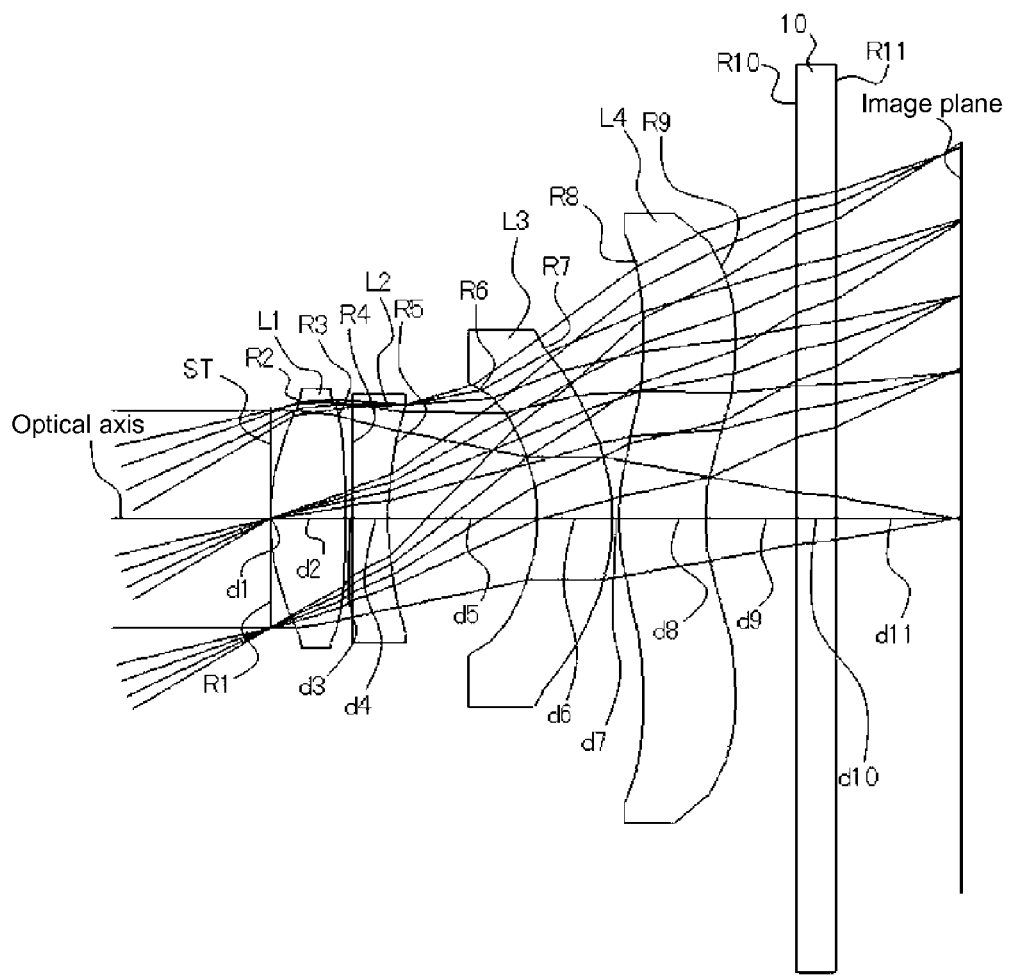
FIG. 16 is a schematic sectional view showing a configuration of an imaging lens in Numerical Data Example 6 according to the embodiment of the invention.

FIG. 14 shows the lateral aberration that corresponds to a half angle of view ω in the imaging lens of Numerical Data Example 5. Furthermore, FIG. 15 shows a spherical aberration SA (mm), an astigmatism AS (mm), and a distortion DIST (%) of the imaging lens, respectively. As shown in FIGS. 14 and 15, also in the imaging lens of Numerical Data Example 5, image surface is satisfactorily corrected and each aberration is suitably corrected.

Numerical Data Example 6

Basic lens data are shown below.

| f = 4.787 mm, Fno = 2.800, ω = 30.96° Unit: mm Surface Data | | | | |
|---|---|---|---|---|
| Surface Number i | R | d | Nd | vd |
| (Object) | ∞ | ∞ | | |
| 1 (Stop) | ∞ | 0.0000 | | |
| 2* | 1.717 | 0.5855 | 1.52470 | 56.2 (= vd1) |
| 3* | −7.143 | 0.0500 | | |
| 4 | 101.561 | 0.2800 | 1.58500 | 29.0 (= vd2) |
| 5 | 2.965 | 1.1446 | | |
| 6* | −1.358 | 0.5804 | 1.58500 | 29.0 (= vd3) |
| 7* | −1.606 | 0.0500 | | |
| 8* | 1.721 | 0.6703 | 1.52470 | 56.2 (= vd4) |
| 9* | 1.452 | 0.7000 | | |
| 10 | ∞ | 0.3000 | 1.51633 | 64.12 |
| 11 | ∞ | 0.9770 | | |
| (Image plane) | ∞ | | | |

| f1 = 2.700 |
| f2 = −5.226 |
| f12 = 4.587 |

-continued f34 = −50.449
L14 = 3.3608

Aspheric Surface Data

Second Surface k = 2.845553E−01, $A_4$ = −4.949311E−03, $A_6$ = −8.999397E−02,
$A_8$ = 1.403312E−01, $A_{10}$ = −1.330315E−01
Third Surface k = −1.024526E+02, $A_4$ = −2.359451E−02, $A_6$ = −4.992230E−02,
$A_8$ = 6.457818E−02, $A_{10}$ = −8.417329E−02
Sixth Surface k = −6.880553, $A_4$ = −1.547665E−01, $A_6$ = 7.877087E−02,
$A_8$ = −4.928846E−02, $A_{10}$ = −1.142651E−01, $A_{12}$ = 2.340331E−02,
$A_{14}$ = 8.391176E−02, $A_{16}$ = −5.957121E−02
Seventh Surface k = −2.013437E−01, $A_4$ = 4.677112E−02, $A_6$ = 1.962590E−02,
$A_8$ = −2.873583E−02, $A_{10}$ = 3.892953E−03, $A_{12}$ = 2.578774E−03,
$A_{14}$ = 2.305930E−05, $A_{16}$ = 4.291869E−06
Eighth Surface k = −1.019482, $A_4$ = −1.609470E−01, $A_6$ = 3.703774E−02,
$A_8$ = −5.941197E−04, $A_{10}$ = −1.121737E−03, $A_{12}$ = 1.887399E−05,
$A_{14}$ = 4.291904E−05, $A_{16}$ = −4.626061E−06
Ninth Surface k = −2.352517, $A_4$ = −1.314209E−01, $A_6$ = 3.462338E−02,
$A_8$ = −3.618695E−03, $A_{10}$ = −3.019371E−04, $A_{12}$ = 6.447691E−05,
$A_{14}$ = 5.153162E−06, $A_{16}$ = −1.152407E−06

The values of the respective conditional expressions are as follows:

$L14/f=0.702$ $f1/f2=-0.517$ $f/f34=-0.095$ $f12/f34=-0.091$ $vd1(=56.2)>50$ $vd2(=29.0)<30$ $vd3(=29.0)=vd2$ $vd4(=56.2)=vd1$

Therefore, the imaging lens in Numerical Data Example 6 satisfies the respective expressions (1) to (8) and (4A). Furthermore, also in the imaging lens of Numerical Data Example 6, both an object-side surface and an image-side surface of the second lens L2 are formed as spherical surfaces, similarly to the imaging lens of Numerical Data Example 3.

Figure 17:
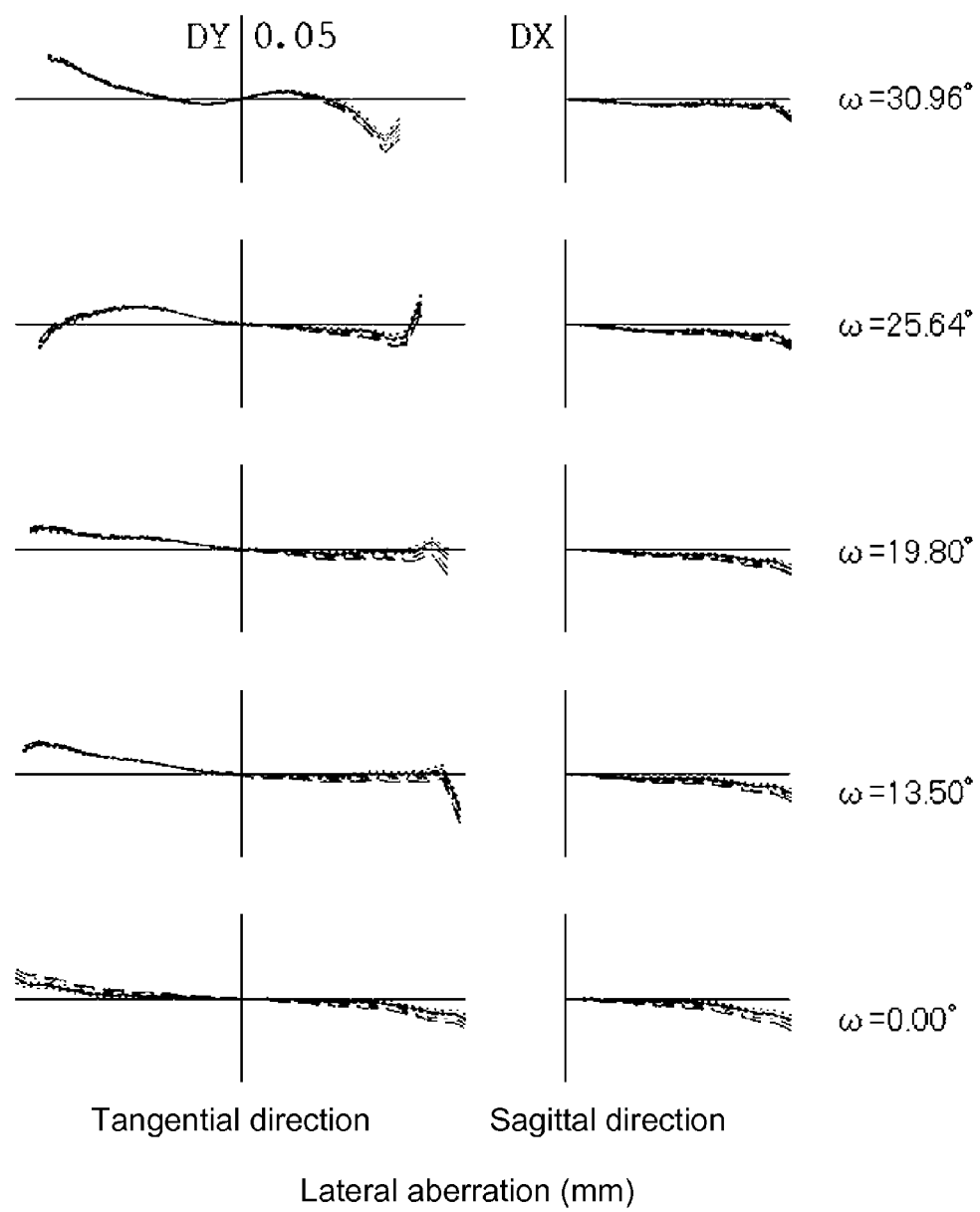
FIG. 17 is an aberration diagram showing a lateral aberration of the imaging lens of Numerical Data Example 6.
Figure 18:
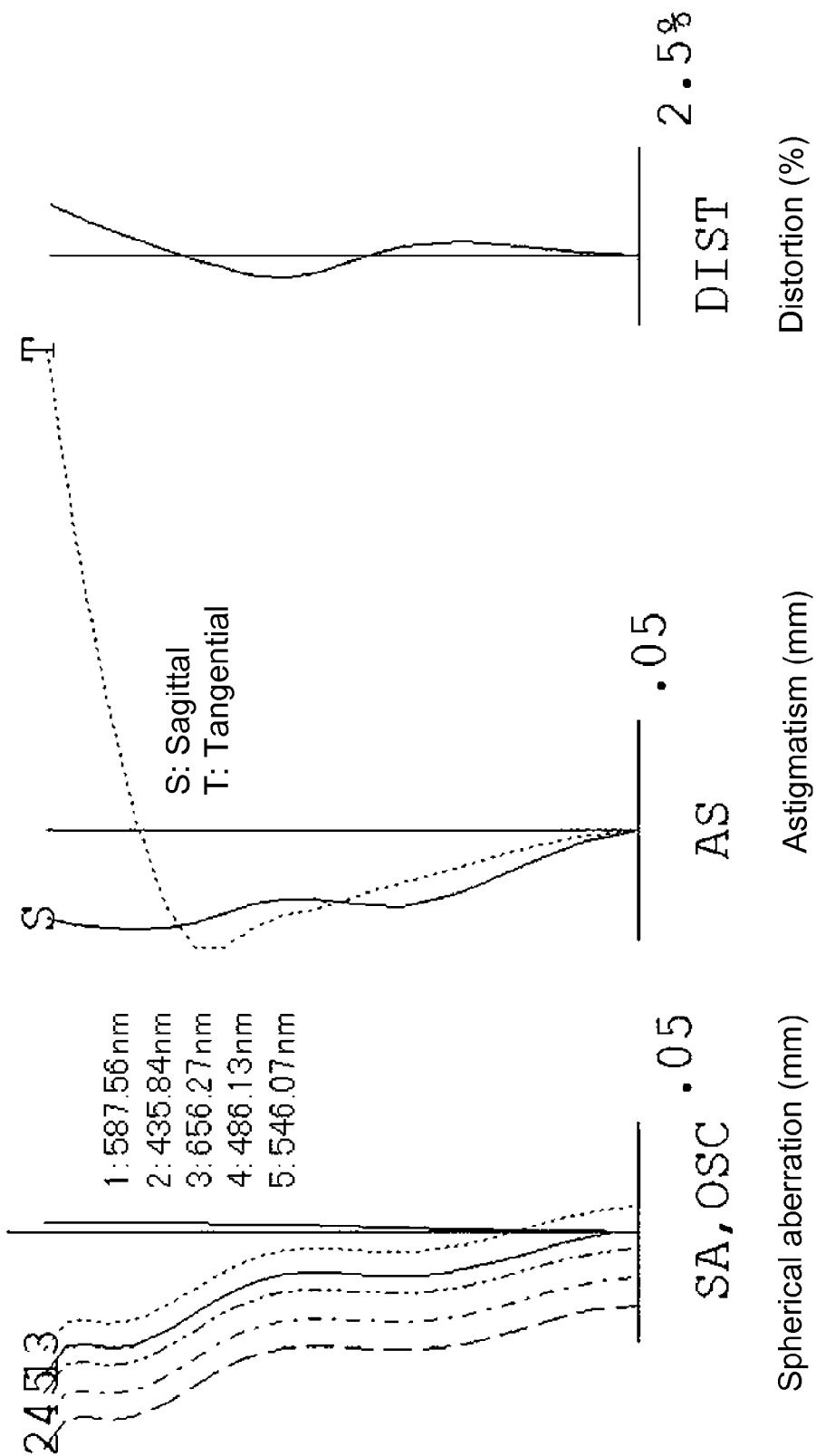
FIG. 18 is an aberration diagram showing a spherical aberration, an astigmatism, and a distortion of the imaging lens of Numerical Data Example 6.

FIG. 17 shows the lateral aberration that corresponds to a half angle of view ω in the imaging lens of Numerical Data Example 6. Furthermore, FIG. 18 shows a spherical aberration SA (mm), an astigmatism AS (mm), and a distortion DIST (%) of the imaging lens, respectively. As shown in FIGS. 17 and 18, also in the imaging lens of Numerical Data Example 6, image surface is satisfactorily corrected and each aberration is suitably corrected.

According to the imaging lens of the embodiment, any lens is made of a plastic material. Conventionally, the first lens having strong refractive power is usually made of a glass material. In case of a glass material, however, since total cost to form a lens is higher than the case of a plastic material, there remains a challenge to reduce the manufacturing cost of the imaging lens. According to the imaging lens of the embodiment, since any lens is made of a plastic material, it is possible to suitably reduce the manufacturing cost.

Accordingly, when the imaging lens of the embodiment is applied to an imaging optical system of a cellular phone, a digital still camera, a portable information terminal, a security camera, a vehicle onboard camera, a network camera, and the like, it is possible to attain both high performances and miniaturization of such cameras.

The invention may be applicable to the imaging lens for mounting on a device that requires the imaging lens to attain miniaturization and satisfactory aberration correcting performances, for example, a cellular phone or a security camera.

What is claimed is:
1. An imaging lens comprising:
   a first lens having positive refractive power;
   a second lens having negative refractive power;
   a third lens having negative refractive power; and
   a fourth lens having negative refractive power, arranged in this order from an object side to an image plane side,
   wherein said first lens is formed in a shape so that a curvature radius of a surface thereof on the object side is positive and a curvature radius of a surface thereof on the image plane side is negative,
   said third lens is formed in a shape so that a curvature radius of a surface thereof on the object side and a curvature radius of a surface thereof on the image plane side are both negative,
   said fourth lens is formed in a shape so that the curvature radius of a surface thereof on the object side and a curvature radius of a surface thereof on the image plane side are both positive,
   a whole lens system has a focal length f, and said first lens has the surface on the object side away from the surface of the fourth lens on the image plane side by a distance L14 on an optical axis so that the following expression is satisfied:

$0.5<L14/f\leq0.708$, and said second lens is formed in a shape so that a curvature radius of a surface thereof on the object side and a curvature radius of a surface thereof on the image plane are both negative.

2. The imaging lens according to claim 1, wherein said first lens has a focal length f1, said second lens has a focal length f2, said first lens and said second lens have a composite focal length f12, and said third lens and said fourth lens have a composite focal length f34 so that the following expressions are satisfied:

$-0.8<f1/f2<-0.3$ $-0.3<f/f34<-0.05$ $-0.3<f12/f34<-0.05$.

3. The imaging lens according to claim 2, wherein said first lens and said second lens have the composite focal length f12, and said third lens and said fourth lens have the composite focal length f34 so that the following expression is satisfied:

$-0.14<f12/f34<-0.05$.

4. The imaging lens according to claim 1, wherein said first lens has an Abbe's number vd1 and said second lens has an Abbe's number vd2 so that the following expressions are satisfied:

$vvd1 > 50$ $vd2 < 30$.

5. The imaging lens according to claim 4, wherein said third lens has an Abbe's number vd3 and said fourth lens has an Abbe's number vd4 so that the following expressions are satisfied:

$vd1 = vd4$ $vd2 = vd3$.

6. An imaging lens comprising:
a first lens having positive refractive power;
a second lens having negative refractive power;
a third lens having negative refractive power; and
a fourth lens having negative refractive power, arranged in this order from an object side to an image plane side,
wherein said first lens is formed in a shape so that a curvature radius of a surface thereof on the object side is positive and a curvature radius of a surface thereof on the image plane side is negative,
said third lens is formed in a shape so that a curvature radius of a surface thereof on the object side and a curvature radius of a surface thereof on the image plane side are both negative,
said fourth lens is formed in a shape so that the curvature radius of a surface thereof on the object side and a curvature radius of a surface thereof on the image plane side are both positive,
a whole lens system has a focal length f, and said first lens has the surface on the object side away from the surface of the fourth lens on the image plane side by a distance L14 on an optical axis so that the following expression is satisfied:

$0.5 < L14/f \leq 0.708$, and said first lens has an Abbe's number vd1, said second lens has an Abbe's number vd2, said third lens has an Abbe's number vd3, and said fourth lens has an Abbe's number vd4 so that the following expressions are satisfied:

$vd1 = vd4$ $vd2 = vd3$.

7. The imaging lens according to claim 6, wherein said second lens is formed in a shape so that a curvature radius of a surface thereof on the object side and a curvature radius of a surface thereof on the image plane are both negative.

8. The imaging lens according to claim 6, wherein said first lens has a focal length f1, said second lens has a focal length f2, said first lens and said second lens have a composite focal length f12, and said third lens and said fourth lens have a composite focal length f34 so that the following expressions are satisfied:

$-0.8 < f1/f2 < -0.3$ $-0.3 < f/f34 < -0.05$ $-0.3 < f12/f34 < -0.05$.

9. The imaging lens according to claim 8, wherein said first lens and said second lens have the composite focal length f12, and said third lens and said fourth lens have the composite focal length f34 so that the following expression is satisfied:

$-0.14 < f12/f34 < -0.05$.

10. The imaging lens according to claim 6, wherein said first lens has the Abbe's number vd1 and said second lens has the Abbe's number vd2 so that the following expressions are satisfied:

$vd1 > 50$ $vd2 < 30$.

* * * * *